US012627444B2

(12) United States Patent
Bao et al.

(10) Patent No.:  US 12,627,444 B2
(45) Date of Patent:      May 12, 2026

(54) POSITIONING REFERENCE SIGNAL DESIGN FOR PHASE COMPENSATION IN BANDWIDTH STITCHING

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Juan Montojo, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 18/257,423

(22) PCT Filed: Nov. 1, 2021

(86) PCT No.: PCT/US2021/072156
§ 371 (c)(1),
(2) Date: Jun. 14, 2023

(87) PCT Pub. No.: WO2022/150226
PCT Pub. Date: Jul. 14, 2022

(65) Prior Publication Data
US 2024/0031101 A1      Jan. 25, 2024

(30) Foreign Application Priority Data
Jan. 7, 2021    (GR) ............................... 20210100012

(51) Int. Cl.
*H04L 5/00*      (2006.01)
*H04L 25/02*     (2006.01)
*H04W 72/12*     (2023.01)

(52) U.S. Cl.
CPC ........ *H04L 5/0051* (2013.01); *H04L 25/0228* (2013.01); *H04W 72/12* (2013.01)

(58) Field of Classification Search
CPC ... H04L 5/0051; H04L 25/0228; H04W 72/12
See application file for complete search history.

(56) References Cited

U.S. PATENT DOCUMENTS

2018/0097596 A1 *  4/2018  Palanivelu ............. H04W 64/00
2018/0279250 A1 *  9/2018  Tandra .................. G01S 5/0236
(Continued)

FOREIGN PATENT DOCUMENTS

JP        2019531468 A     10/2019
WO      WO-2020168253 A1    8/2020

OTHER PUBLICATIONS

Ericsson: "Downlink Positioning Solutions: Design And Evaluations", 3GPP TSG RAN WG1 96, R1-1903139 DL Positioning Solutions, 3rd Generation Partnership Project, Mobile Competence Centre, 650, Route Des Lucioles, F-06921 Sophia-Antipolis Cedex, France, vol. RAN WG1. No. Athens. Greece, Feb. 25, 2019-Mar. 1, 2019, Feb. 15, 2019, XP051600835, 28 Pages.
(Continued)

*Primary Examiner* — Melanie Jagannathan
(74) *Attorney, Agent, or Firm* — Thien T. Nguyen

(57)                ABSTRACT

Disclosed are techniques for wireless communication. In an aspect, a receiver device receives a first plurality of positioning reference signal (PRS) resources scheduled within a PRS bandwidth on a plurality of time intervals, the first plurality of PRS resources staggered in frequency across the plurality of time intervals, each pair of consecutive PRS resources of the first plurality of PRS resources partially overlapping in frequency, and performs phase estimation for
(Continued)

the first plurality of PRS resources based, at least in part, on the overlap in frequency between each pair of consecutive PRS resources.

58 Claims, 17 Drawing Sheets

(56) References Cited

U.S. PATENT DOCUMENTS

| | | | | |
|---|---|---|---|---|
| 2020/0344712 | A1 | 10/2020 | Akkarakaran et al. | |
| 2020/0351047 | A1* | 11/2020 | Akkarakaran | G01S 1/0428 |
| 2022/0116169 | A1* | 4/2022 | Stare | H04L 5/0048 |
| 2022/0123879 | A1* | 4/2022 | Munier | H04W 64/00 |
| 2023/0132666 | A1* | 5/2023 | Zhang | H04L 5/0044 |
| | | | | 370/329 |
| 2023/0142451 | A1* | 5/2023 | Gao | H04L 5/0048 |
| 2023/0179358 | A1* | 6/2023 | Gao | H04L 5/0094 |
| | | | | 370/329 |
| 2023/0362873 | A1* | 11/2023 | Shi | H04W 64/00 |
| 2023/0370221 | A1* | 11/2023 | Schaepperle | H04L 5/0048 |
| 2024/0057012 | A1* | 2/2024 | Oteri | G01S 5/0205 |
| 2025/0151021 | A1* | 5/2025 | Pan | H04W 52/0216 |

OTHER PUBLICATIONS

Fraunhofer IIS: "Improved Channel and Timing Estimation for efeMTC", 3GPP Draft, 3GPP TSG RAN WG1 Meeting #90bis, R1-1718273, 3rd Generation Partnership Project (3GPP), Mobile Competence Centre, 650, Route Des Lucioles, F-06921 Sophia-Antipolis Cedex, France, vol. Ran WG1, No. Prague, CZ, Oct. 9, 2017-Oct. 13, 2017, Sep. 29, 2017 (Sep. 29, 2017), XP051351673, 4 Pages, sec. 1 sec.2 figure 1.

International Search Report and Written Opinion—PCT/US2021/072156—ISA/EPO—Feb. 24, 2022.

Mitsubishi Electric: "Views on DL Reference Signal Designs for NR Positioning", 3GPP Draft, 3GPP TSG RAN WG1 Meeting #97, R1-1907177, Positioning_DL_B, 3rd Generation Partnership Project (3GPP), Mobile Competence Centre, 650, Route Des Lucioles, F-06921 Sophia-Antipolis Cedex, France, Reno, USA, May 13, 2019-May 17, 2019, May 3, 2019 (May 3, 2019), XP051709203, 8 Pages.

3GPP: "3rd Generation Partnership Project, Technical Specification Group Radio Access Network, LTE Positioning Protocol (LPP), (Release 16)", 3GPP TS 37.355 V16.3.0, Technical Specification, Dec. 2020, Jan. 6, 2021, pp. 1-295, Chapters 3.1, 6.4.3, 6.5.1.5, 6.5.1.7, 6.5.2.2, 6.5.10.5 and 7.4.2.

Fraunhofer IIS: "Improved Channel and Timing Estimation for efeMTC", 3GPP TSG RAN WG1 Meeting #90bis, R1-1718273, Prague, CZ, Oct. 9-13, 2017, 4 Pages, Sep. 29, 2017.

LG Electronics: "Discussions on DL only based Positioning", 3GPP TSG RAN WG1 #96, R1-1903346, Athens, Greece, Feb. 25-Mar. 1, 2019, 15 pages, Feb. 22, 2019.

Taiwan Search Report—TW110140754—TIPO—Jul. 15, 2025.

* cited by examiner

250

270

LMF

272

SLP

260

5GC

266

AMF

SMF

UPF

264

262

265

265

263

263

220

NEW RAN

224 ng-eNB gNB

222

223

204

306

390

Network
Entity

Schedule a first plurality of PRS resources within a PRS bandwidth on a plurality of time intervals, the first plurality of PRS resources staggered in frequency across the plurality of time intervals, wherein each pair of consecutive PRS resources of the first plurality of PRS resources is configured to partially overlap in frequency — 1510

Transmit an indication of at least the overlap in frequency between each pair of consecutive PRS resources of the first plurality of PRS resources to enable a receiver device to perform phase estimation based, at least in part, on the overlap in frequency between each pair of consecutive PRS resources — 1520

*FIG. 15*

POSITIONING REFERENCE SIGNAL DESIGN FOR PHASE COMPENSATION IN BANDWIDTH STITCHING

CROSS-REFERENCE TO RELATED APPLICATIONS

The present Application for Patent claims priority to Greek Patent Application No. 20210100012, entitled "POSITIONING REFERENCE SIGNAL DESIGN FOR PHASE COMPENSATION IN BANDWIDTH STITCHING," filed Jan. 7, 2021, and is a national stage application, filed under 35 U.S.C. § 371, of International Patent Application No. PCT/US2021/072156, entitled, "POSITIONING REFERENCE SIGNAL DESIGN FOR PHASE COMPENSATION IN BANDWIDTH STITCHING", filed Nov. 1, 2021, both of which are assigned to the assignee hereof and are expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a receiver device includes receiving a first plurality of positioning reference signal (PRS) resources scheduled within a PRS bandwidth on a plurality of time intervals, the first plurality of PRS resources staggered in frequency across the plurality of time intervals, each pair of consecutive PRS resources of the first plurality of PRS resources partially overlapping in frequency; and performing phase estimation for the first plurality of PRS resources based, at least in part, on the overlap in frequency between each pair of consecutive PRS resources.

In an aspect, a method of wireless communication performed by a network entity includes scheduling a first plurality of positioning reference signal (PRS) resources within a PRS bandwidth on a plurality of time intervals, the first plurality of PRS resources staggered in frequency across the plurality of time intervals, wherein each pair of consecutive PRS resources of the first plurality of PRS resources is configured to partially overlap in frequency; and transmitting an indication of at least the overlap in frequency between each pair of consecutive PRS resources of the first plurality of PRS resources to enable a receiver device to perform phase estimation based, at least in part, on the overlap in frequency between each pair of consecutive PRS resources.

In an aspect, a receiver device includes a memory; at least one transceiver; and at least one processor communicatively coupled to the memory and the at least one transceiver, the at least one processor configured to: receive a first plurality of positioning reference signal (PRS) resources scheduled within a PRS bandwidth on a plurality of time intervals, the first plurality of PRS resources staggered in frequency across the plurality of time intervals, each pair of consecutive PRS resources of the first plurality of PRS resources partially overlapping in frequency; and perform phase estimation for the first plurality of PRS resources based, at least in part, on the overlap in frequency between each pair of consecutive PRS resources.

In an aspect, a network entity includes a memory; at least one transceiver; and at least one processor communicatively coupled to the memory and the at least one transceiver, the at least one processor configured to: schedule a first plurality of positioning reference signal (PRS) resources within a PRS bandwidth on a plurality of time intervals, the first plurality of PRS resources staggered in frequency across the plurality of time intervals, wherein each pair of consecutive PRS resources of the first plurality of PRS resources is configured to partially overlap in frequency; and cause the at least one transceiver to transmit an indication of at least the overlap in frequency between each pair of consecutive PRS resources of the first plurality of PRS resources to enable a receiver device to perform phase estimation based, at least in part, on the overlap in frequency between each pair of consecutive PRS resources.

In an aspect, a receiver device includes means for receiving a first plurality of positioning reference signal (PRS) resources scheduled within a PRS bandwidth on a plurality of time intervals, the first plurality of PRS resources staggered in frequency across the plurality of time intervals, each pair of consecutive PRS resources of the first plurality of PRS resources partially overlapping in frequency; and means for performing phase estimation for the first plurality of PRS resources based, at least in part, on the overlap in frequency between each pair of consecutive PRS resources.

In an aspect, a network entity includes means for scheduling a first plurality of positioning reference signal (PRS) resources within a PRS bandwidth on a plurality of time intervals, the first plurality of PRS resources staggered in frequency across the plurality of time intervals, wherein each pair of consecutive PRS resources of the first plurality of PRS resources is configured to partially overlap in frequency; and means for transmitting an indication of at least the overlap in frequency between each pair of consecutive PRS resources of the first plurality of PRS resources to enable a receiver device to perform phase estimation based, at least in part, on the overlap in frequency between each pair of consecutive PRS resources.

In an aspect, a non-transitory computer-readable medium storing computer-executable instructions includes computer-executable instructions comprising: at least one instruction instructing a receiver device to receive a first plurality of positioning reference signal (PRS) resources scheduled within a PRS bandwidth on a plurality of time intervals, the first plurality of PRS resources staggered in frequency across the plurality of time intervals, each pair of consecutive PRS resources of the first plurality of PRS resources partially overlapping in frequency; and at least one instruction instructing the receiver device to perform phase estimation for the first plurality of PRS resources based, at least in part, on the overlap in frequency between each pair of consecutive PRS resources.

In an aspect, a non-transitory computer-readable medium storing computer-executable instructions includes computer-executable instructions comprising: at least one instruction instructing a network entity to schedule a first plurality of positioning reference signal (PRS) resources within a PRS bandwidth on a plurality of time intervals, the first plurality of PRS resources staggered in frequency across the plurality of time intervals, wherein each pair of consecutive PRS resources of the first plurality of PRS resources is configured to partially overlap in frequency; and at least one instruction instructing the network entity to transmit an indication of at least the overlap in frequency between each pair of consecutive PRS resources of the first plurality of PRS resources to enable a receiver device to perform phase estimation based, at least in part, on the overlap in frequency between each pair of consecutive PRS resources.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 14 and 15 illustrate example methods of wireless communication, according to aspects of the disclosure.

DETAILED DESCRIPTION

Figure 1:
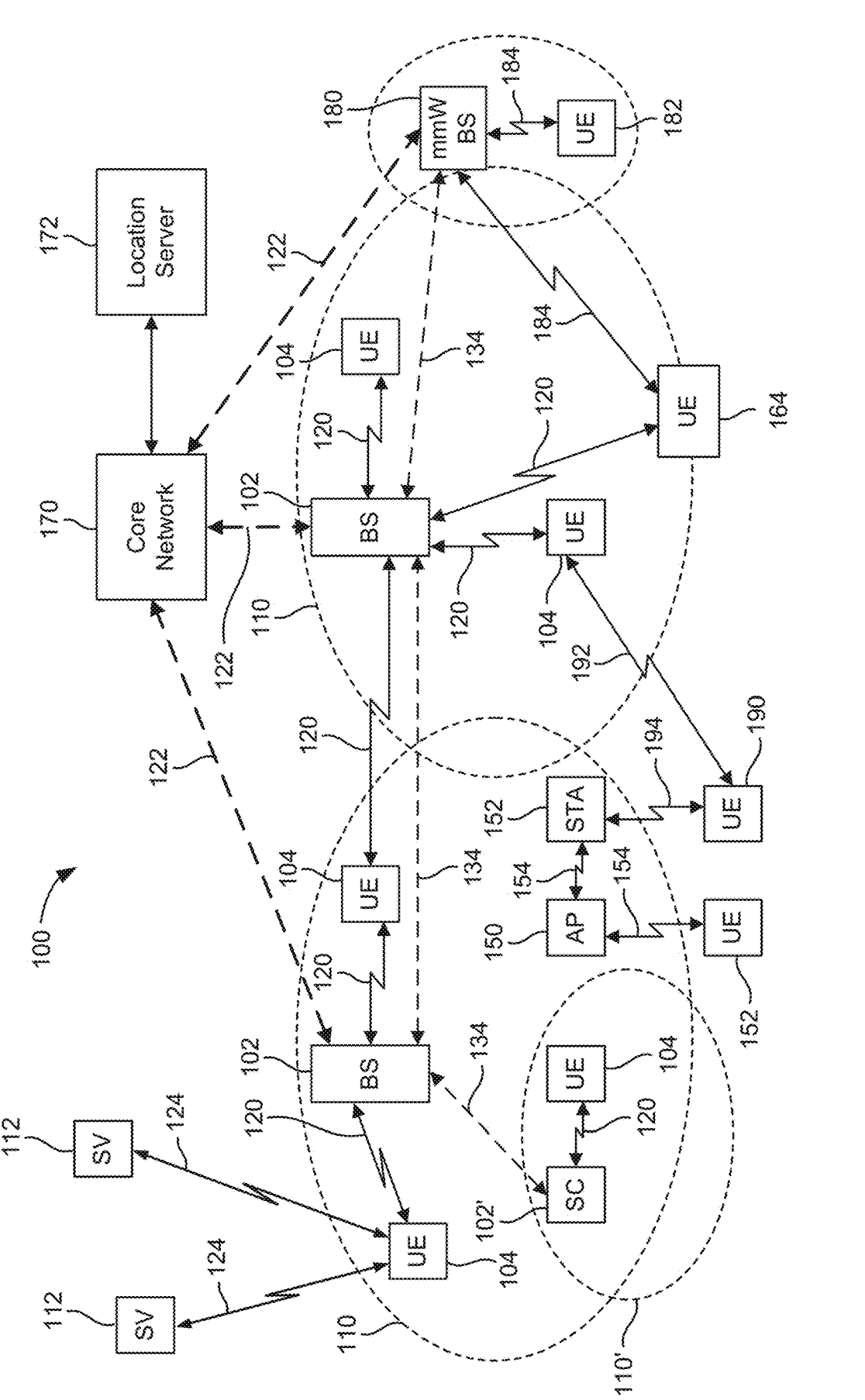
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
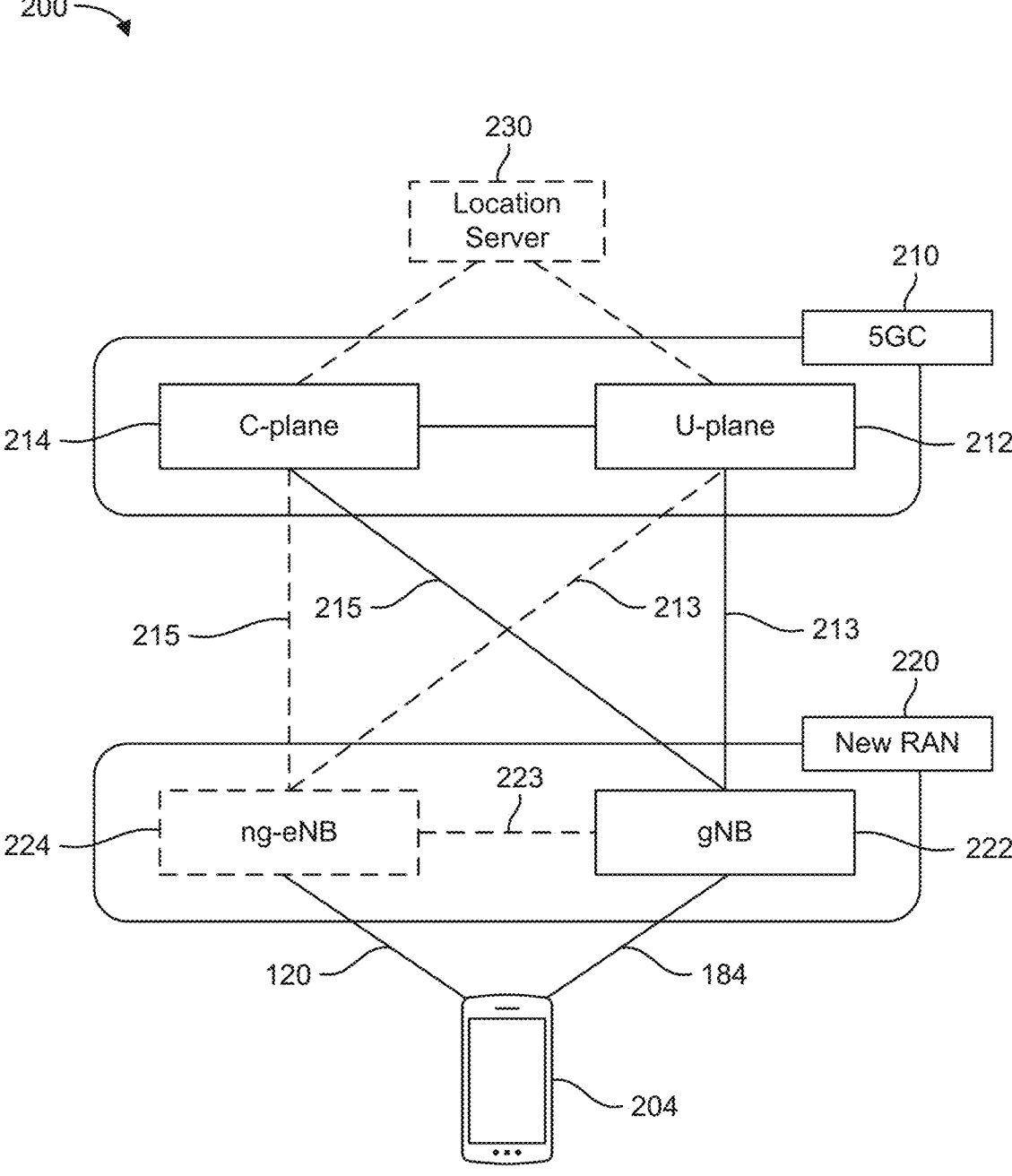
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:

FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
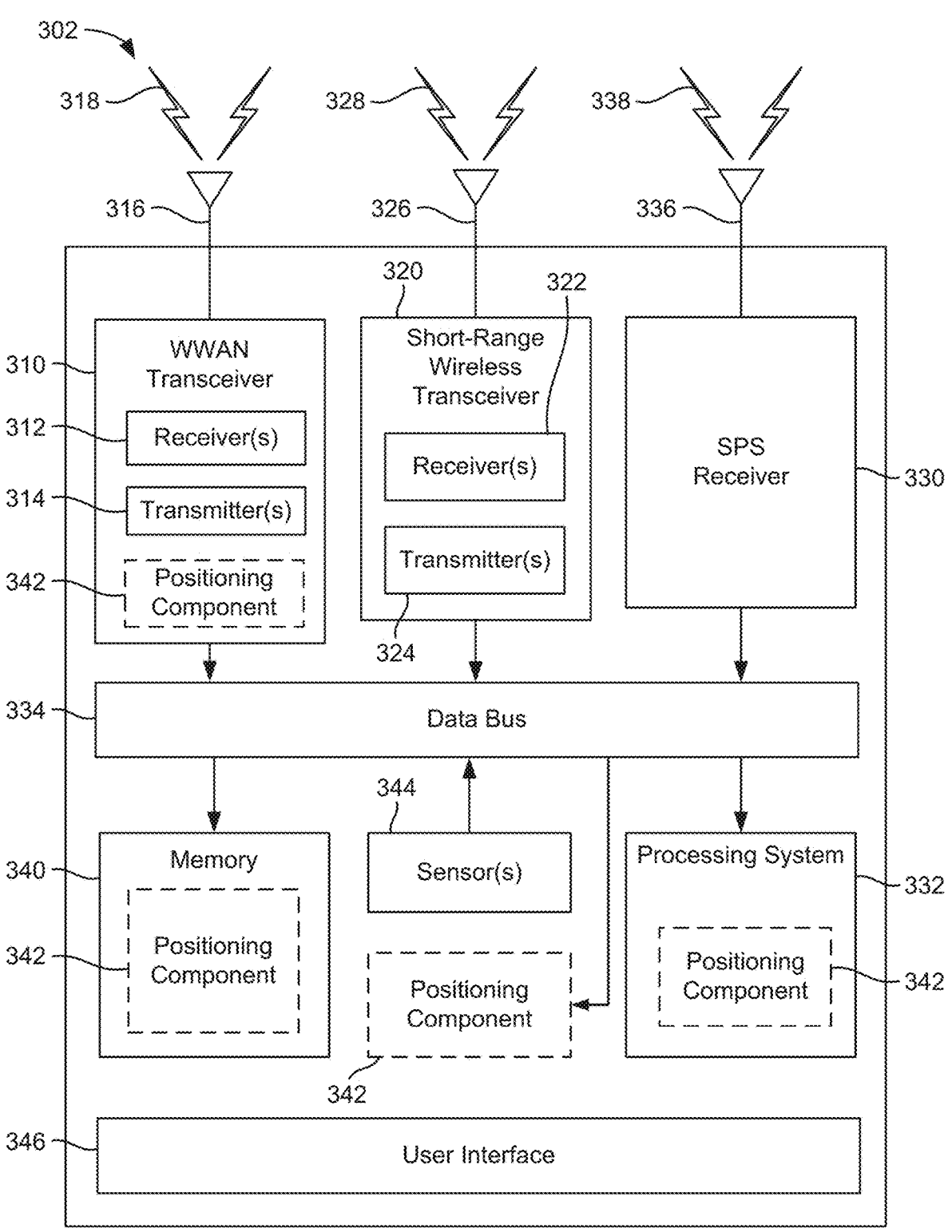
FIGS. 3A to 3C are simplified block diagrams of several sample aspects of components that may be employed in a user equipment (UE), a base station, and a network entity, respectively, and configured to support communications as taught herein.
Figure 3B:
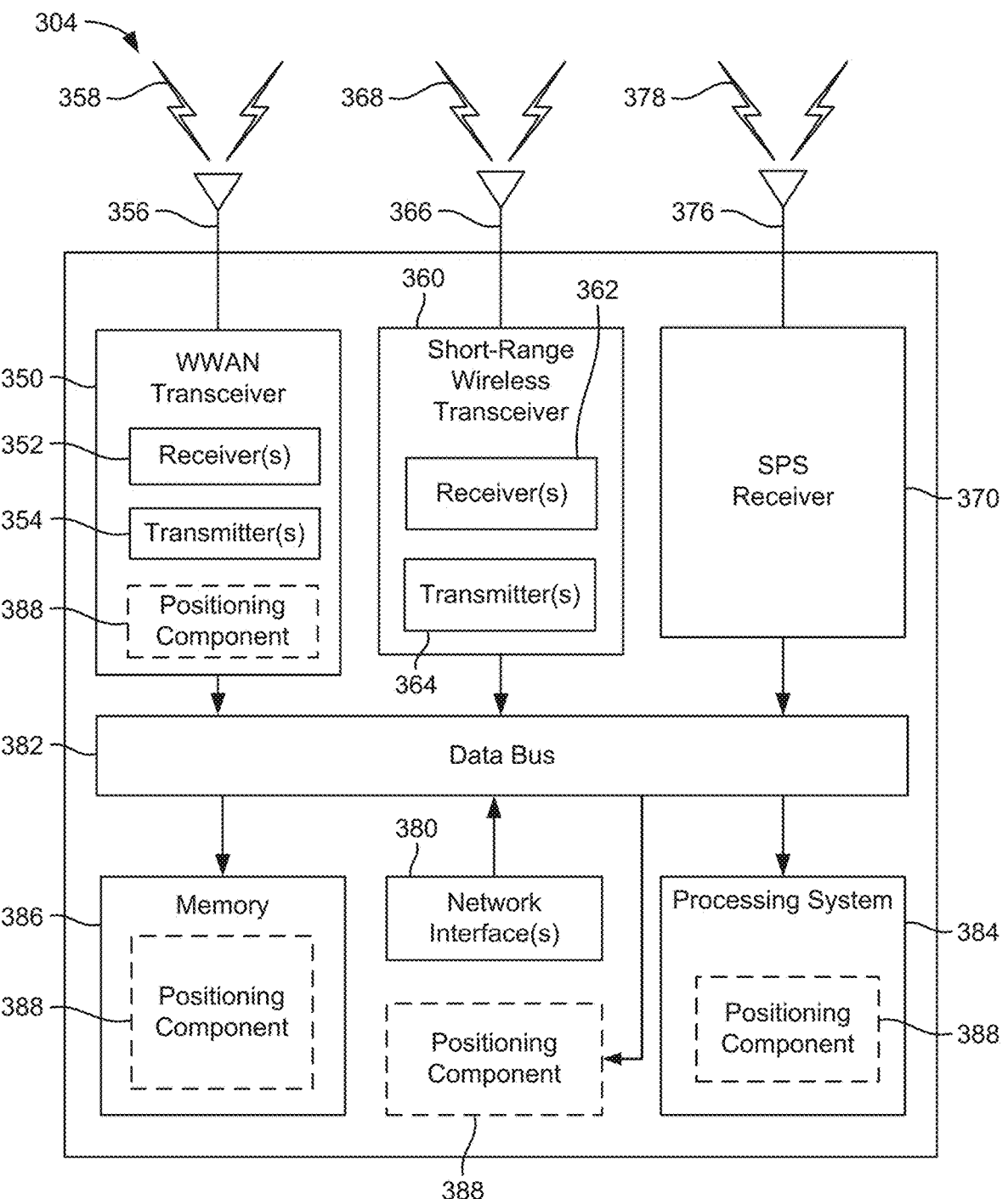
Figure 3C:
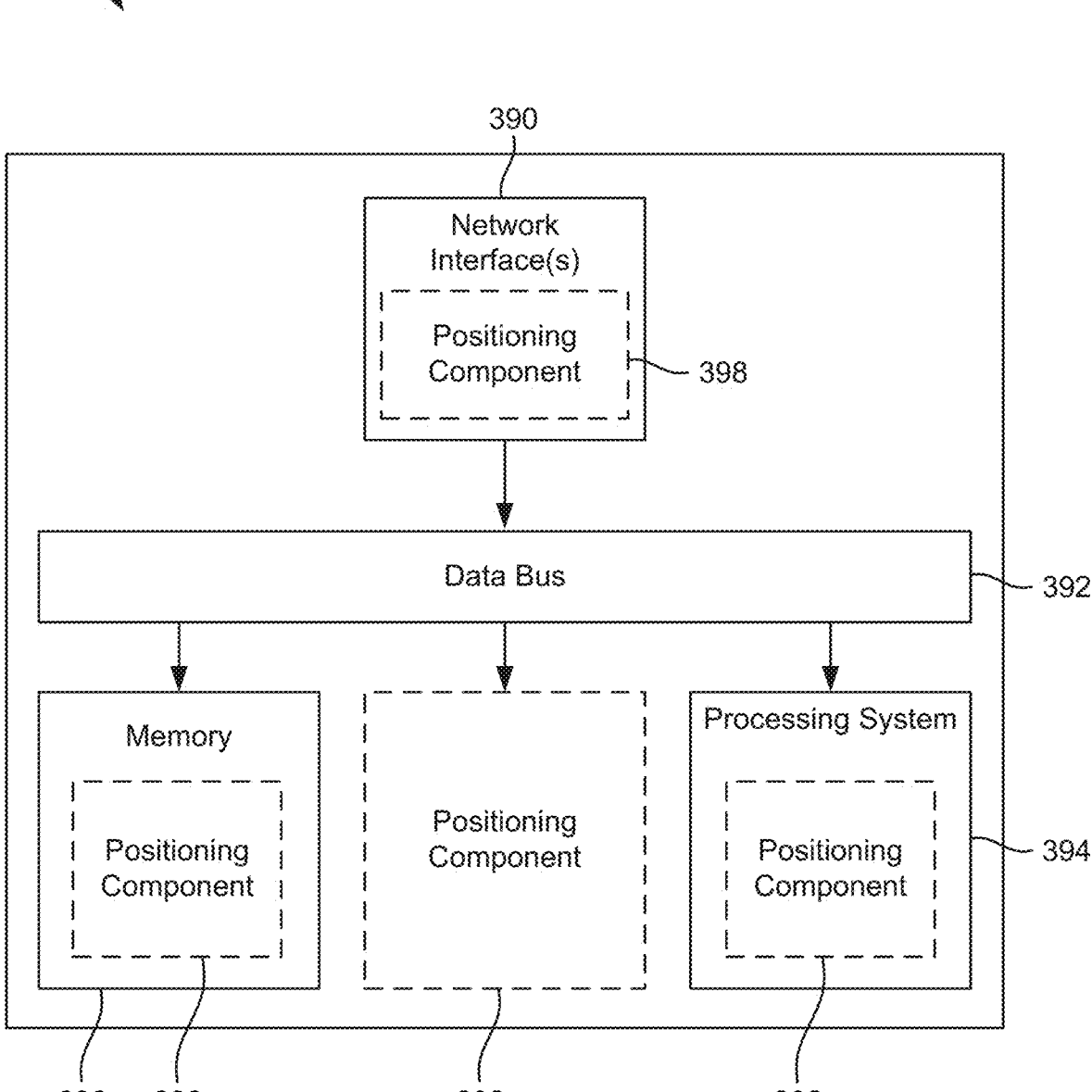

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more processors, such as one or more general purpose processors, multi-core processors, ASICs, digital signal processors (DSPs), field programmable gate arrays (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.). Alternatively, the positioning components 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the positioning component 342, which may be part of the WWAN transceiver 310, the memory component 340, the processing system 332, or any combination thereof, or may be a standalone component. FIG. 3B illustrates possible locations of the positioning component 388, which may be part of the WWAN transceiver 350, the memory component 386, the processing system 384, or any combination thereof, or may be a standalone component. FIG. 3C illustrates possible locations of the positioning component 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processing systems 332, 384, 394, the transceivers 310, 320, 350, and 360, the memory components 340, 386, and 396, the positioning components 342, 388, and 398, etc.

Figure 4A:
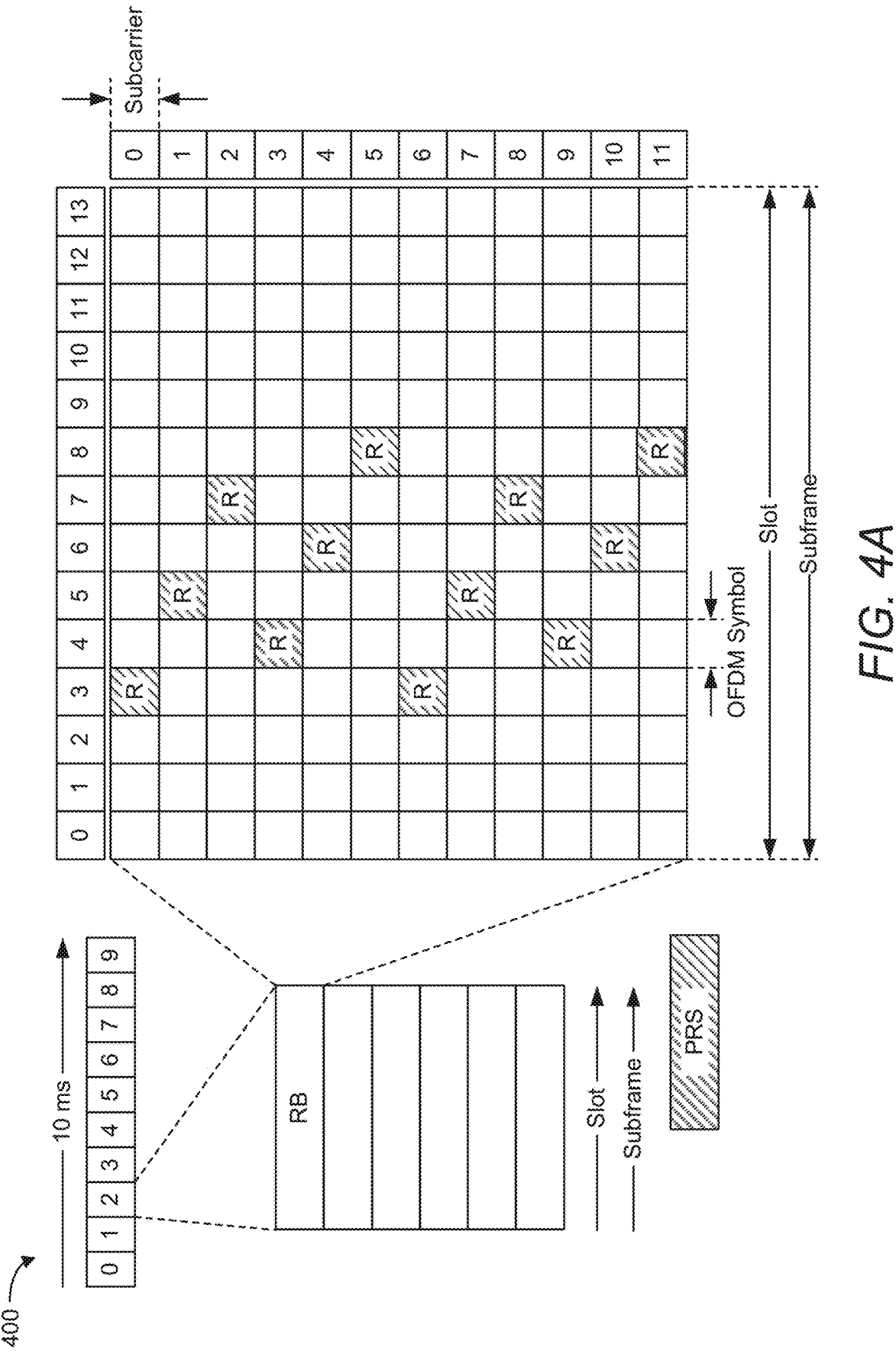
FIGS. 4A to 4D are diagrams illustrating example frame structures and channels within the frame structures, according to aspects of the disclosure.
Figure 4B:
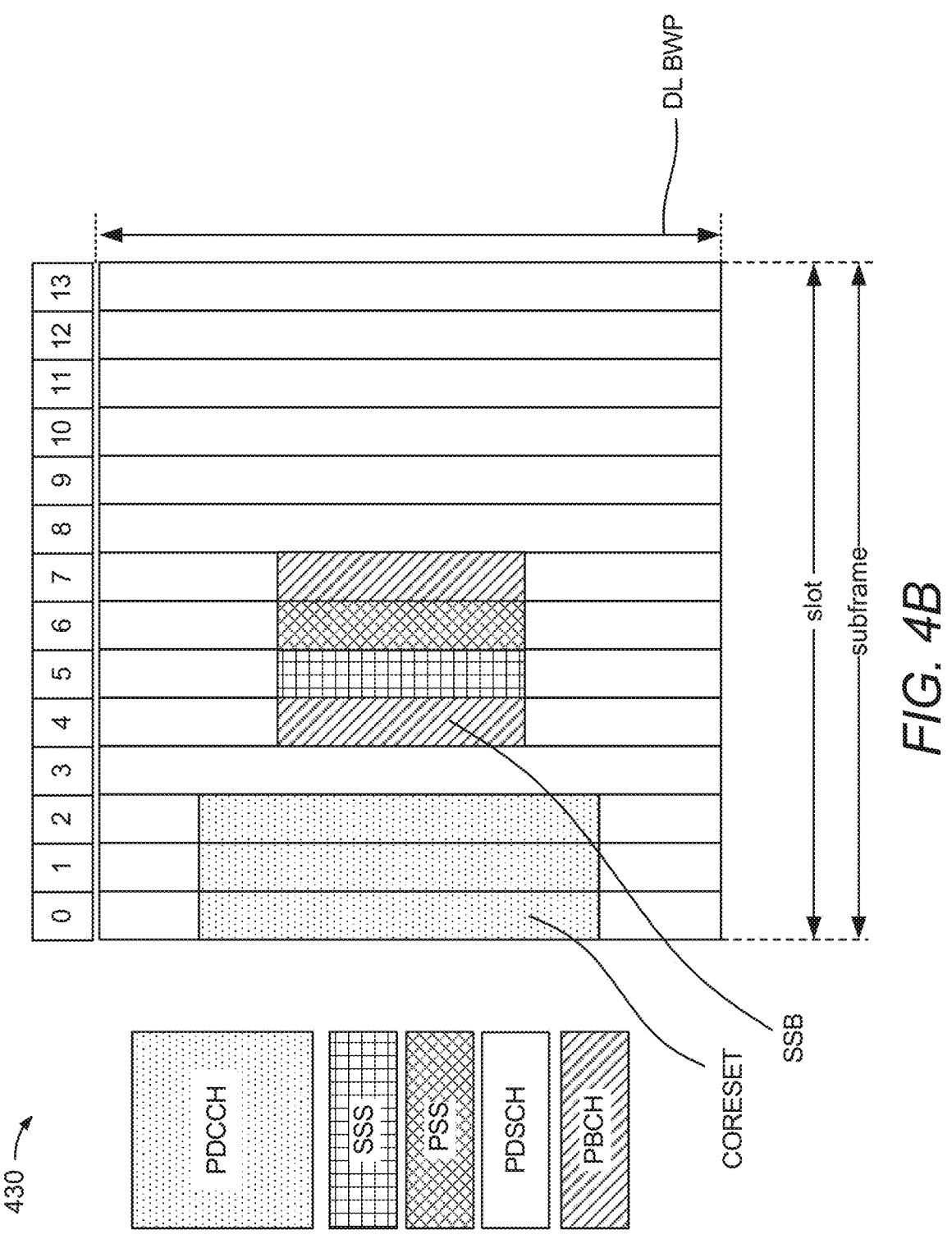
Figure 4C:
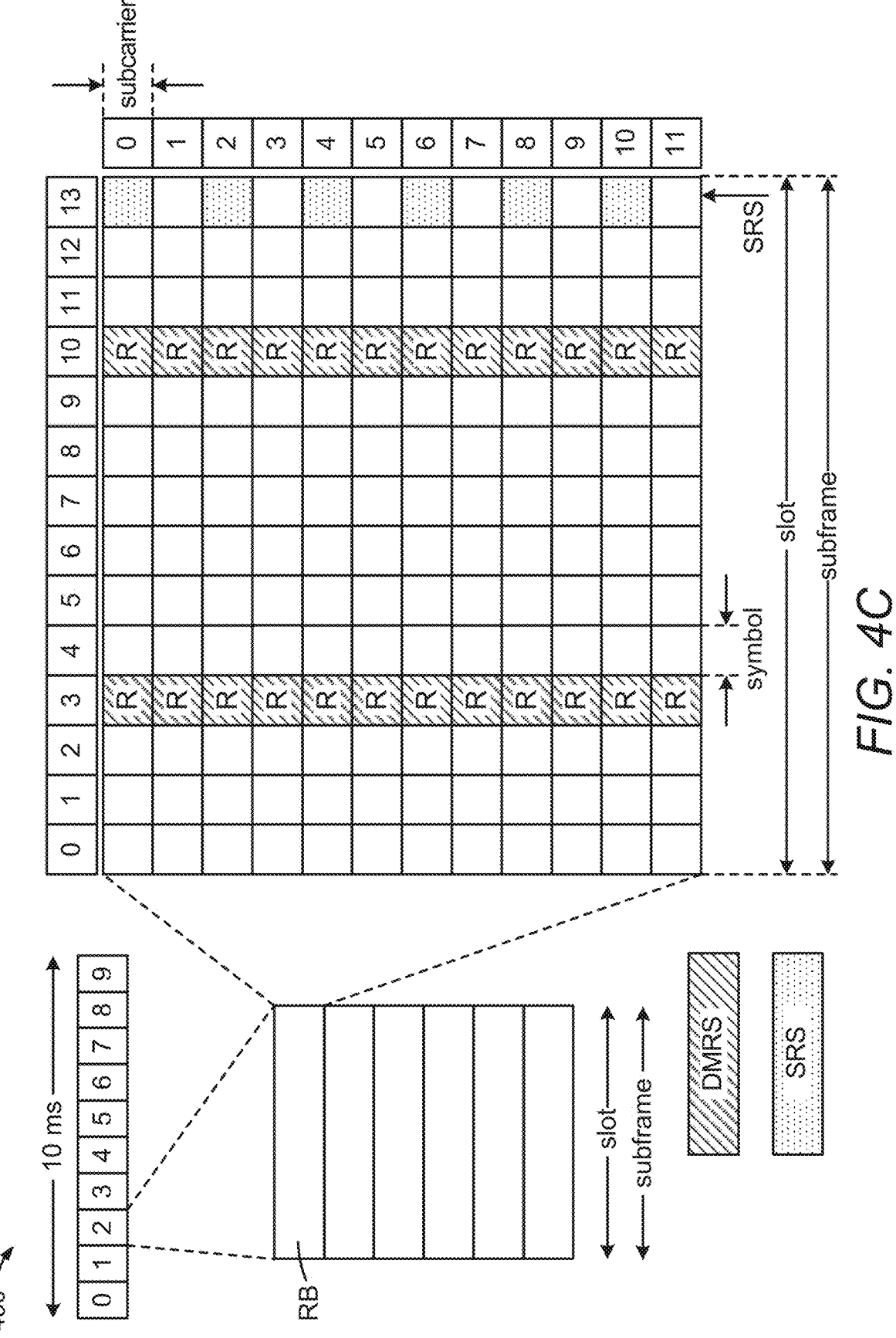
Figure 4D:
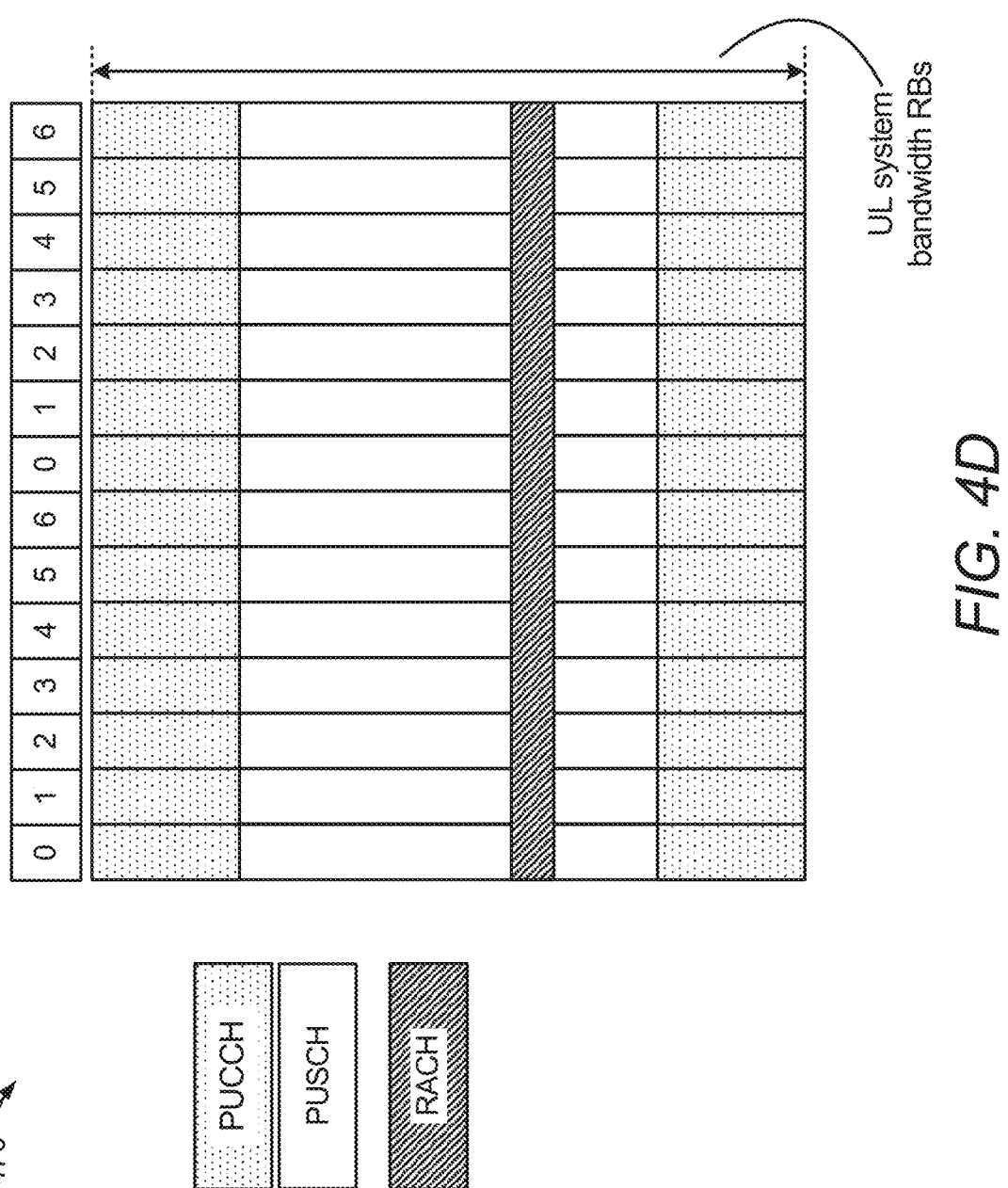

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. FIG. 4C is a diagram 450 illustrating an example of an uplink frame structure, according to aspects of the disclosure. FIG. 4D is a diagram 470 illustrating an example of channels within an uplink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu=1$), there are two slots per subframe, slots per frame, the slot duration is 0.5 ms, the symbol duration is 33.3 $\mu$s, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIGS. 4A to 4D, a numerology of 15 kHz is used. Thus, in the time domain, a 10 ms frame is divided into 10 equally sized subframes of 1 ms each, and each subframe includes one time slot. In FIGS. 4A to 4D, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A to 4D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates example locations of REs carrying PRS (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-6 (which spans six symbols). That is, the locations of the shaded REs (labeled "R") indicate a comb-6 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3}; 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu*\{4, 5, 8, 10, 16, 20, 32, 40, 64,$ 80, 160, 320, 640, 1280, 2560, 5120, 10240} slots, with μ=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth (i.e., the region of bandwidth allocated for transmission of downlink PRS) may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., PUSCH). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

As illustrated in FIG. 4C, some of the REs (labeled "R") carry DMRS for channel estimation at the receiver (e.g., a base station, another UE, etc.). A UE may additionally transmit SRS in, for example, the last symbol of a slot. The SRS may have a comb structure, and a UE may transmit SRS on one of the combs. In the example of FIG. 4C, the illustrated SRS is comb-2 over one symbol. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 4-symbol comb-2: {0, 1, 0, 1}; 4-symbol comb-4: {0, 2, 1, 3}; 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

A collection of resource elements that are used for transmission of SRS is referred to as an "SRS resource," and may be identified by the parameter "SRS-ResourceId." "The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID ("SRS-ResourceSetId").

Generally, a UE transmits SRS to enable the receiving base station (either the serving base station or a neighboring base station) to measure the channel quality between the UE and the base station. However, SRS also can be used as uplink positioning reference signals for uplink positioning procedures, such as UL-TDOA, multi-RTT, DL-AoA, etc.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "Path-LossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI).

FIG. 4D illustrates an example of various channels within an uplink slot of a frame, according to aspects of the disclosure. A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 230, LMF 270, SLP 272) may provide assistance data to the UE. For example, the assistance data may include identifiers of the base stations (or the cells/ TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). in some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32.μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

NR positioning techniques are expected to provide high accuracy (horizontal and vertical), low latency, network efficiency (scalability, reference signal overhead, etc.), and device efficiency (power consumption, complexity, etc.), especially for commercial positioning uses cases (including general commercial use cases and specifically (I)IoT use cases). Referring to the accuracy expectation, the accuracy of a location estimate depends on the accuracy of the positioning measurements (e.g., ToA, RSTD, Rx-Tx, etc.) of received PRS, and the larger the bandwidth of the measured PRS, the more accurate the positioning measurements.

One technique for increasing the bandwidth of PRS is aggregating PRS across the frequency domain (referred to as "frequency domain stitching") and/or the time domain (referred to as "time domain stitching"). In frequency domain PRS stitching, PRS are transmitted (by a base station or UE) on multiple, preferably contiguous, bandwidth intervals (e.g., positioning frequency layers, bandwidth parts (BWPs), groups of contiguous PRBs, etc.) within one or more component carriers, frequency bands, or other portions of bandwidth, and the receiver (a UE or base station) measures the PRS across the (contiguous) bandwidth intervals. By spanning multiple bandwidth intervals, the effective bandwidth of the PRS is increased, resulting in increased positioning measurement accuracy. In time domain PRS stitching, the multiple bandwidth intervals also span multiple, preferably contiguous, time intervals (e.g., groups of contiguous symbols, slots, subframes, etc.). When implementing time and/ or frequency domain PRS stitching, the PRS should preferably be transmitted on multiple bandwidth intervals and/or time intervals such that the receiver can make certain assumptions about the PRS transmitted within the multiple slots and/or positioning frequency layers (e.g., QCL type, same antenna port, etc.).

Note that the time intervals need not be contiguous in the time domain. There may be some small gap (e.g., a few symbols) between time intervals if the phases between consecutive PRS resources can still be estimated. If the gap is too large (e.g., above some threshold number of symbols), then the receiver's environment may change too much and PRS stitching may become useless.

Figure 5:
FIG. 5 is a diagram of an example of frequency domain positioning reference signal (PRS) stitching, according to aspects of the disclosure.
Figure 5:
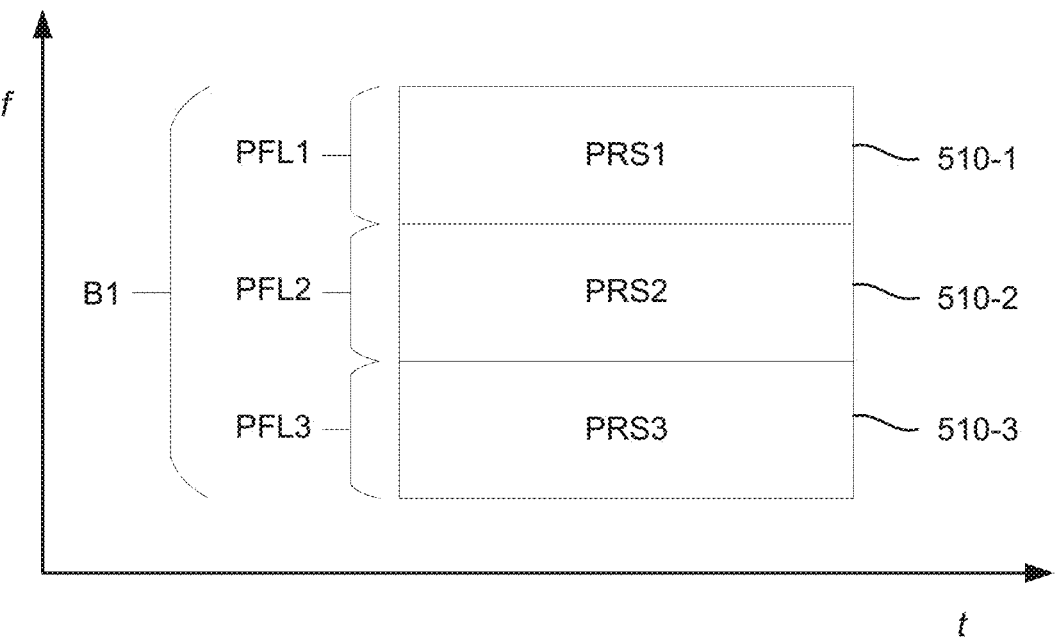

FIG. 5 is a diagram 500 of an example of frequency domain PRS stitching, according to aspects of the disclosure. As shown in FIG. 5, PRS 510-1, 510-2, and 510-3 (labeled "PRS1," "PRS2," and "PRS3," respectively) are transmitted on respective positioning frequency layers (labeled "PFL1," "PFL2," and "PFL3," respectively) within a given frequency band (labeled "B1"). The frequency band "B1" may be a frequency band in FR1 or FR2. The PRS 510 may be DL-PRS transmitted by a base station to one or more UEs, UL-PRS transmitted by a UE to one or more base stations, or sidelink PRS transmitted by a UE to one or more other UEs.

In FIG. 5, time is represented horizontally and frequency is represented vertically. Thus, in the example of FIG. 5, the three positioning frequency layers are contiguous in the frequency domain. Although FIG. 5 illustrates a single frequency band "B1," the positioning frequency layers may instead span multiple frequency bands (possibly in both FR1 and FR2), with or without a guard band between the different frequency bands. Further, the positioning frequency layers may span one or more component carriers within the one or more frequency bands. In addition, while FIG. 5 illustrates PRS 510 transmitted on three positioning frequency layers, as will be appreciated, PRS 510 may be transmitted on only two positioning frequency layers or on more than three positioning frequency layers.

In the time domain, the PRS 510 may be PRS occasions, PRS resources, slots containing PRS, etc. The PRS 510 should generally be identical to each other except that they are transmitted on different positioning frequency layers. However, while the PRS 510 in FIG. 5 are illustrated as beginning and ending at the same time, this may not always be the case, and some PRS 510 may begin or end or have a different length than other PRS 510.

Using different positioning frequency layers (especially across different component carriers or frequency bands) for the transmission and reception of the PRS 510 introduces the issue of phase shift between the waveforms carrying the different PRS 510. Phase shift is the difference in phase, or phase difference, between two waveforms. Thus, for example, the phase of the waveform of PRS 510-2 may be slightly different than the phase of the waveform of PRS 510-1. Mathematically, the channel on which a first PRS (e.g., PRS 510-1) is transmitted can be represented as h(f,t1), where f represents frequency, t1 represents time, and h represents the channel as a function of frequency f and time t1. The channel on which a related PRS (e.g., a PRS to be stitched together with the first PRS, such as PRS 510-2) is transmitted can be represented as h(f,t1).e^jθ, where e^jθ represents the phase shift, or phase difference, between the channel on which the first PRS is transmitted and the channel on which the related PRS is transmitted.

Phase shift can occur in both intra- and inter-band PRS (i.e., PRS on positioning frequency layers within the same component carrier or frequency band or PRS on positioning frequency layers within multiple component carriers or frequency bands). Phase shift is particularly noticeable when two signals (waveforms) are combined together by a physical process, such as by a receiver's analog front-end. However, phase shift can be caused by the architecture of both the transmitter and receiver. For example, any change in the transmit/receive RF chain may cause discontinuity in the phase of the PRS 510. A phase shift between the waveforms of PRS transmitted on multiple positioning frequency layers can cause additional measurement errors in the measurement estimation procedure (e.g., ToA estimation procedure), which lowers the positioning accuracy.

Figure 6:
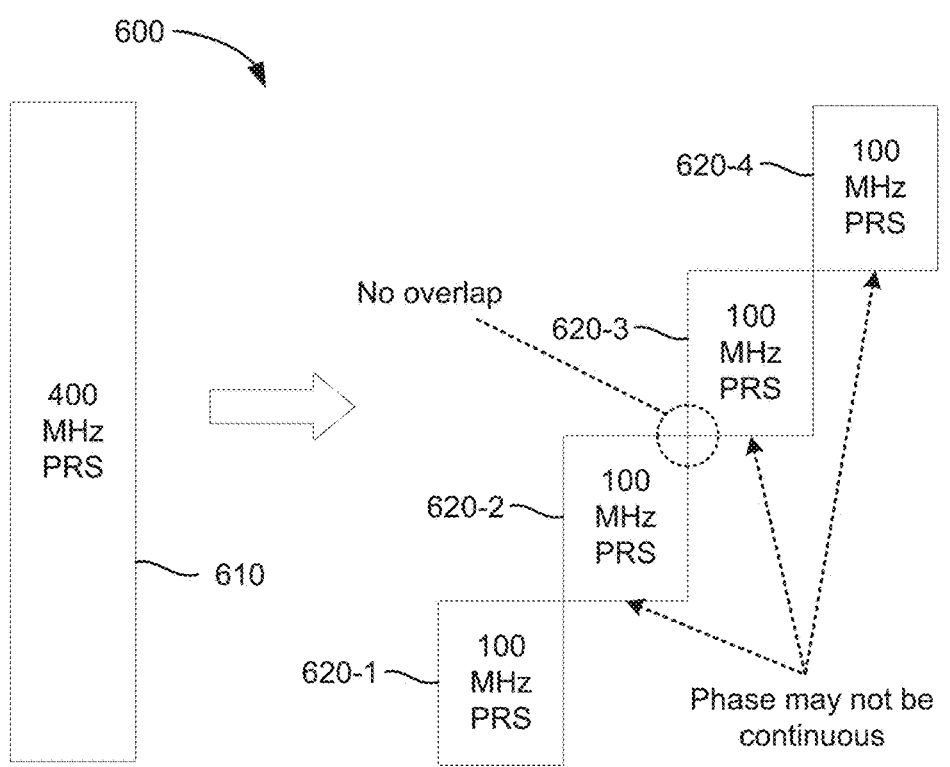
FIGS. 6 and 7 are diagrams of examples of time domain PRS stitching, according to aspects of the disclosure.

Intra/inter-band time domain stitching provides coherent processing gains, which can improve the SINR of the measured PRS. FIG. 6 is a diagram 600 of an example of time domain PRS stitching, according to aspects of the disclosure. In FIG. 6, time is represented horizontally and frequency is represented vertically. Thus, each block represents a PRS resource 610/620 having some length and bandwidth. In the example of FIG. 6, the length of each PRS resource 610/620 in the time domain may be two symbols and the bandwidth may be either 400 MHz or 100 MHz. The PRS resources 610/620 may be DL PRS or UL PRS (e.g., SRS). A transmitter (e.g., a UE or base station) may transmit PRS on the PRS resources 610/620 and/or a receiver (e.g., a base station or a UE) may measure PRS on the PRS resources 610/620.

In time domain PRS stitching, rather than schedule a PRS resource within a single time interval over the total PRS bandwidth (400 MHz in the example of FIG. 6), a PRS resource is scheduled over consecutive time intervals, with the PRS resource in each time interval spanning a portion of the total PRS bandwidth. The PRS resources across the time intervals have a stairstep pattern in order to cover the total PRS bandwidth. The PRS resource within a time interval may be referred to as an "instance" or a "repetition" of a PRS resource (although a subsequent repetition may have a different PRS sequence than a previous repetition). Thus, in the example of FIG. 6, rather than schedule a 400 MHz PRS resource 610 over one time interval (e.g., two symbols), four contiguous 100 MHz PRS resources 620 are scheduled over four consecutive time intervals (e.g., eight consecutive symbols). Specifically, a first 100 MHz PRS resource 620-1 is scheduled in a first time interval, a second 100 MHz PRS resource 620-2 is scheduled in the next time interval, a third 100 MHz PRS resource 620-3 is scheduled in the next time interval, and a fourth 100 MHz PRS resource 620-4 is scheduled in the last time interval.

The time domain bandwidth stitching scheme illustrated in FIG. 6 provides approximately a 6 dB gain in the measured PRS. However, bandwidth stitching over time suffers from common phase noise due to the change in the RF chain as the receiver measures the PRS over the consecutive time intervals. This will degrade the ToA estimation of the PRS.

To address this issue, instead of scheduling PRS resources with perfect frequency division multiplexing (FDM) (as illustrated in FIG. 6), the PRS resources scheduled in adjacent time intervals can overlap some number of RBs in the frequency domain. There are benefits to both the transmitter and receiver of such an overlap. On the transmitter side, the overlap improves power spectral density (PSD), that is, it increases the signal energy transmitted over a finite frequency spectrum and time period. On the receiver side, the overlap can be used for phase estimation and then phase correction (mitigation) based on the phase estimation, thereby improving measurement accuracy. As such, the overlapped RBs can be considered as PTRS-like reference signal.

Figure 7:
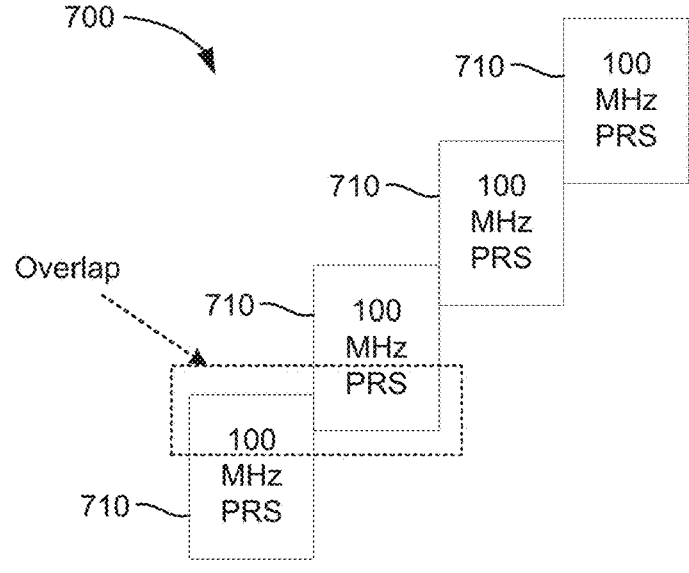

FIG. 7 is a diagram 700 of an example of time domain PRS stitching, according to aspects of the disclosure. In FIG. 7, time is represented horizontally and frequency is represented vertically. Thus, each block represents a PRS resource 710 having some length and bandwidth. In the example of FIG. 7, the length of each PRS resource 710 in the time domain may be two symbols and the bandwidth may be 100 MHz. The PRS resources 710 may be DL PRS or UL PRS (e.g., SRS). A transmitter (e.g., a UE or base station) may transmit PRS on the PRS resources 710 and/or a receiver (e.g., a base station or a UE) may measure PRS on the PRS resources 710.

As shown in FIG. 7, each consecutive PRS resource 710 overlaps with the preceding PRS resource 710 in the frequency domain by some number of REs or RBs. A receiver can use the phase estimate of the PRS resource in the overlap region in one time interval to estimate the phase of the PRS resource in the next time interval. In an aspect, the size of the overlap region (i.e., the number of REs or RBs) can be determined by a location server in the core network (e.g., LMF 270), the base station transmitting the DL PRS or scheduling the UL PRS, an LMF in the RAN, or recommended by the UE.

For PTRS, a UE can recommend a preferred PTRS pattern, or PTRS density, in the UE's capability report (via the parameters "ptrs-DensityRecommendationSetDL" and "ptrs-DensityRecommendationSetUL"). Similarly, for the overlap region, a UE may report its preferred overlap size to the network (e.g., serving cell, location server) as part of the UE's capability report. The UE may report its preference to the serving cell via one or more RRC messages or to the location server via one or more LPP messages. The UE's preference may also be referred to as a "capability," insofar as the UE may not be able to process a PTRS pattern or overlap region that is significantly different from the one it recommends. Note that the recommended PTRS pattern or overlap region size may change from positioning session to positioning session, or even within a positioning session, depending on the current capabilities of the UE (e.g., battery level, current power consumption, types of location services supported at the time of the request, etc.) and the requirements of the location estimate (e.g., accuracy, latency, etc.).

Alternatively, or additionally, the location server may request information related to the UE's PTRS pattern/density from the serving cell via one or more NR positioning protocol (e.g., NR positioning protocol type A (NRPPa)) messages. The overlap region may then be derived from the UE's PTRS density. For example, the PTRS density may indicate the UE's processing capability, and based on the PTRS density and estimated processing capability, the location server may determine the size of the overlap region. Note that where the location server determines the size of the overlap region, it instructs all cells/TRPs involved in a positioning session with the UE to transmit PRS using that overlap.

The UE's recommendation may contain an indication of which PRS pattern the UE supports (described further below), the ratio of the overlap region (i.e., the ratio of the overlapping portion of a PRS resource to the non-overlapping portion of the PRS resource), the absolute size of the overlap region in RBs, REs, etc., or any combination thereof.

In an aspect, multiple PRS resources can be scheduled together in an overlapping staircase pattern. In the following figures, like shading, or cross-hatching, indicates like PRS resources. For example, repetitions of a PRS resource having the same shading/cross-hatching are part of the same PRS resource.

Figure 8:
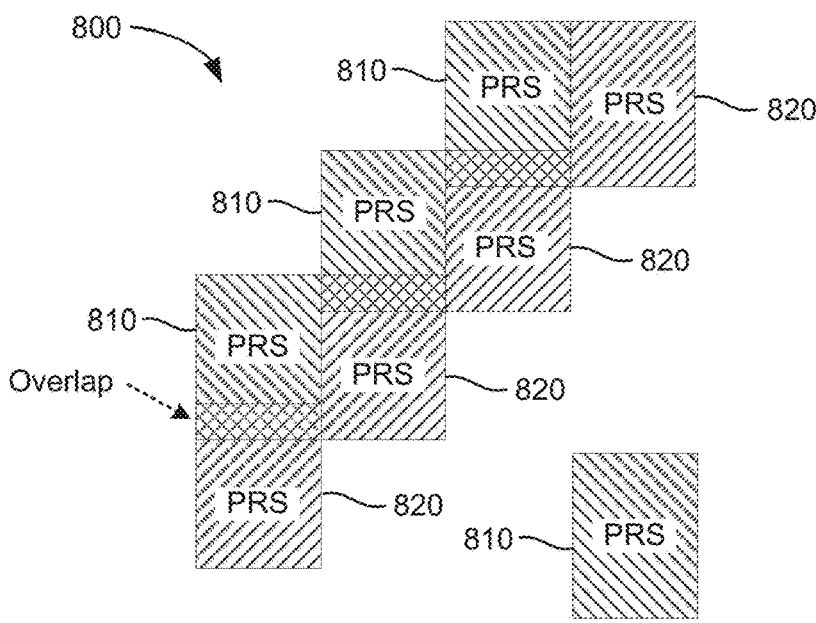
FIGS. 8 to 10 are diagrams of examples of multiple PRS resource staircases, according to aspects of the disclosure.

FIG. 8 is a diagram 800 of an example of multiple PRS resource staircases, according to aspects of the disclosure. In FIG. 8, time is represented horizontally and frequency is represented vertically. Thus, each block represents a PRS resource 810/820 having some length and bandwidth. In the example of FIG. 8, the length of each PRS resource 810/820 in the time domain may be two symbols and the bandwidth may be 100 MHz. The PRS resources 810/820 may be DL PRS or UL PRS (e.g., SRS). A first transmitter (e.g., a UE or base station) may transmit PRS on the PRS resources 810 and a second transmitter may transmit PRS on the PRS resources 820. The same or different receivers (e.g., a base station or UE) may measure PRS on the different PRS resources 810 and 820.

Currently, multiplexing between PRS resources and general communications data is not permitted without a measurement gap. As such, communications data is not transmitted on the resources around the PRS resources 810/820. If, however, such multiplexing is allowed in the future, a single PRS staircase (one of the staircases of PRS resources 810 or 820) can be defined using the currently supported PRS parameters. For example, for intra-band PRS resources (within one frequency layer), multiple PRS resource sets can be defined with the same bandwidth in the staircase pattern and with the repetition and muting pattern. Similarly, the staircase of PRS resources 810/820 can be defined across multiple frequency layers. Another PRS configuration could be used to define the other PRS resource staircase.

In the current case of no multiplexing between PRS resources and data communications without measurement gaps, the staircase pattern illustrated in FIG. 8 could waste system resources. Specifically, the resources around the PRS resources 810 and 820 would be unused, and therefore wasted. However, if multiple PRS resource staircases are frequency division multiplexed together, as shown in FIG. 8, the overlapping regions for phase estimation will collide with others. That is, as shown in FIG. 8, the overlapping regions for PRS resources 810 are the same as the overlapping regions for PRS resources 820.

There are several solutions to this issue. A first solution provides for staircase PRS resources with wrap around. A second solution provides for staircase PRS resources with wrap around and extra repetitions. A third solution provides for advanced comb and muting designs in the overlap region.

Figure 9:
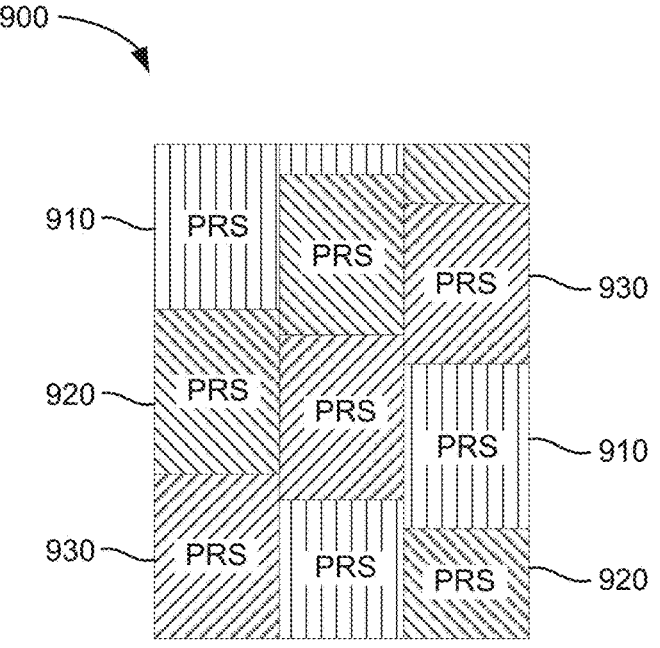

The first solution is illustrated in FIG. 9. FIG. 9 is a diagram 900 of an example of multiple PRS resource staircases, according to aspects of the disclosure. In FIG. 9, time is represented horizontally and frequency is represented vertically. Thus, each block represents a PRS resource 910/920/930 having some length and bandwidth. In the example of FIG. 9, the length of each PRS resource 910/920/930 in the time domain may be two symbols and the bandwidth may be 100 MHz. The PRS resources 910/920/930 may be DL PRS or UL PRS (e.g., SRS). A first transmitter (e.g., a UE or base station) may transmit PRS on the PRS resources 910, a second transmitter may transmit PRS on the PRS resources 920, and a third transmitter may transmit PRS on the PRS resources 930. The same or different receivers (e.g., a base station or UE) may measure PRS on the different PRS resources 910, 920, and 930.

Each group of PRS resources 910/920/930 can be designed using a similar approach. The number of repetitions of a PRS resource 910/920/930 in the time domain (three in the example of FIG. 9) may be determined by the mathematical floor function of (i.e., the greatest integer less than or equal to) the total PRS bandwidth divided by the bandwidth of each PRS resource. Thus, in the example of FIG. 9, given a total PRS bandwidth of 300 MHz and an individual PRS resource bandwidth of 100 MHz, there are three repetitions of each PRS resource 910/920/930.

As discussed above, the overlap region in each time interval (e.g., each two-symbol time period in FIG. 9) is determined by the location server or the base station, or recommended by the UE. The overlap region of a given PRS resource in the frequency domain across time intervals (e.g., the overlapping regions of PRS resources 930 from time interval to time interval) enables the receiver to estimate the phase between consecutive PRS resources 910/920/930. And, once stitched together in the time domain, each PRS resource 910/920/930 will span almost the total PRS bandwidth. For example, stitching all of the PRS resources 930 together will synthesize a PRS having a bandwidth of almost 300 MHz. For PRS resources 910 and 920, where there is a gap in bandwidth when stitching them together, the assumption is that the phase of each time interval (i.e., column) is the same, but the phase between time intervals (i.e., columns) is different. As such, the upper part of PRS resource 910, for example, in the second time interval provides a phase estimation for the lower part of PRS resource 910 in the second time interval. With that, the three time intervals can be stitched together.

An advantage of the first solution is that it saves resources, insofar as the resources around the PRS resources are not unused/wasted. However, a drawback is that the phases of the wrapped-around PRS resources (e.g., PRS resources 910 in the second time interval and PRS resources 920 in the third time interval) may be different in the frequency selective channels (i.e., different component carriers may have uncorrelated channel fading). As such, the phase of the upper portion of a PRS resource in a time interval (e.g., the upper portion of PRS resource 910 in the second time interval) may be different than the phase of the lower portion of the PRS resource in the time interval (e.g., the lower portion of PRS resource 910 in the second time interval). As such, the upper portion cannot provide phase estimation for the lower portion. Thus, if the receiver uses the phase of such a PRS resource, it may incorrectly estimate the phase for that PRS resource in the next time interval (e.g., PRS resource 910 in the third time interval).

Figure 10:
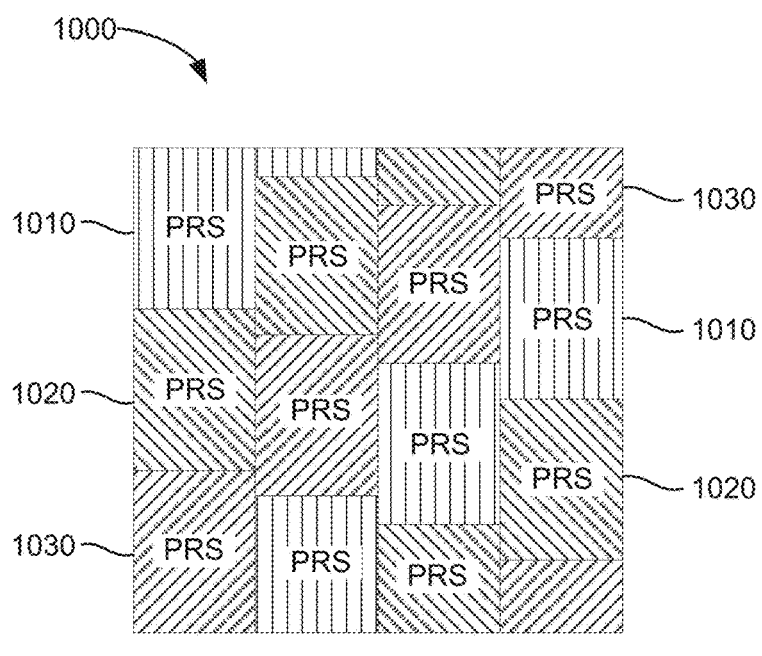

The second solution is illustrated in FIG. 10. FIG. 10 is a diagram 1000 of an example of multiple PRS resource staircases, according to aspects of the disclosure. In FIG. 10, time is represented horizontally and frequency is represented vertically. Thus, each block represents a PRS resource 1010/1020/1030 having some length and bandwidth. In the example of FIG. 10, the length of each PRS resource 1010/1020/1030 in the time domain may be two symbols and the bandwidth may be 100 MHz. The PRS resources 1010/1020/1030 may be DL PRS or UL PRS (e.g., SRS). A first transmitter (e.g., a UE or base station) may transmit PRS on the PRS resources 1010, a second transmitter may transmit PRS on the PRS resources 1020, and a third transmitter may transmit PRS on the PRS resources 1030. The same or different receivers (e.g., a base station or UE) may measure PRS on the different PRS resources 1010, 1020, and 1030.

To address the drawback of the first solution described above with reference to FIG. 9, one or more repetitions of the PRS resources 1010, 1020, and 1030 can be added in the time domain. In the example of FIG. 10, one repetition (i.e., one time interval) has been added. As illustrated in FIG. 9, PRS resources 930 are continuous over the whole PRS bandwidth. However, PRS resources 910 and 920 are not continuous. Because of the discontinuity caused by the wrap around, the phase may be estimated incorrectly, and therefore, the phase may be discontinuous after a wrapped-around PRS resource. With an extra repetition, as illustrated in FIG. 10, the other groups of PRS resources can meet the frequency domain continuity requirement. Specifically, in the example of FIG. 10, within the first three repetitions, only PRS resource 1030 is continuous in the frequency domain. However, adding a fourth repetition allows for PRS resources 1010 and 1020 to be continuous in the frequency domain as well. Thus, once stitched together in the time domain, each PRS resource 1010/1020/1030 will span the total PRS bandwidth.

Referring now to the third solution, the third solution uses advanced combs and muting patterns in the overlap region. This solution allows for the resource elements (REs) of PRS resources (e.g., PRS resources 1010, 1020, 1030) to be interleaved in a different pattern (i.e., a different comb or muting pattern) in the overlap region to maintain FDM or time division multiplexing (TDM) among PRS resources. Currently, each PRS resource follows the same PRS pattern (e.g., same offset, comb size, etc.).

Referring first to using a different comb pattern in the overlap region, as described above, the transmission of a PRS resource within a given RB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a RB. For example, for comb-4, for each symbol of the PRS resource configuration, REs corresponding to every fourth subcarrier (such as subcarriers 0, 4, 8) are used to transmit PRS of the PRS resource.

Figure 11:
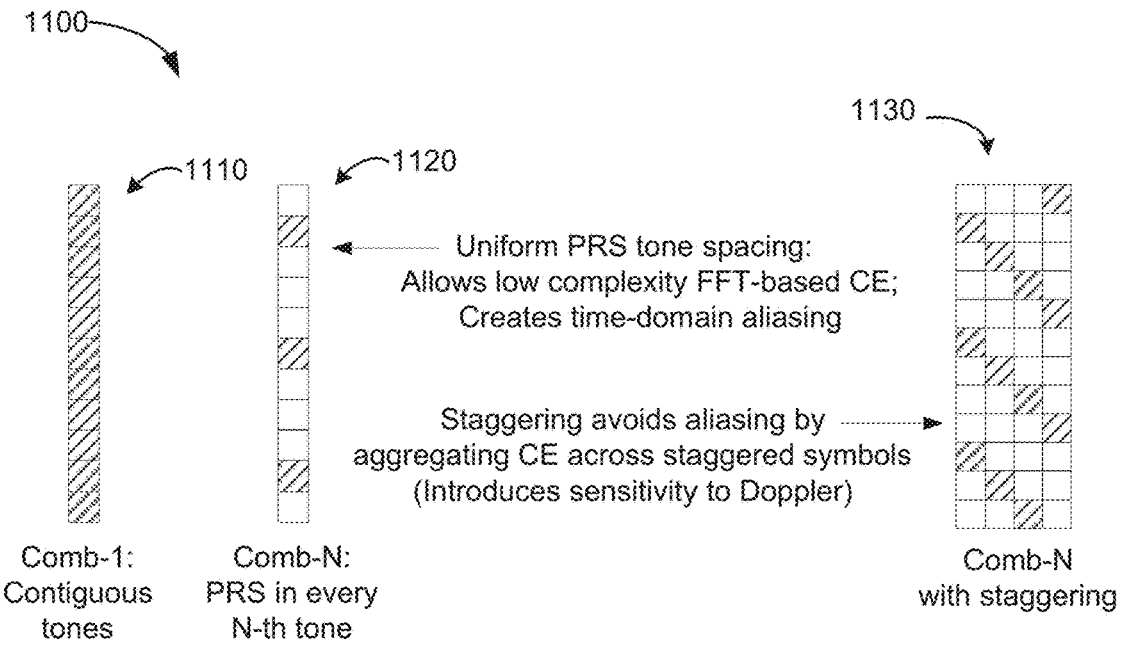
FIG. 11 is a diagram illustrating various aspects of comb design, according to aspects of the disclosure.

FIG. 11 is a diagram 1100 illustrating various aspects of comb design, according to aspects of the disclosure. In FIG. 11, time is represented horizontally and frequency is represented vertically. Each block represents an RE, and as such, is one symbol in the time domain and one tone, or subcarrier, in the frequency domain. Shaded blocks represent REs carrying, or scheduled for, a PRS resource.

The leftmost comb pattern 1110 is a comb-1 pattern on a single symbol, which means that the PRS resource (comprising the shaded blocks) is scheduled on each tone of the symbol. The middle comb pattern 1120 is a comb-N pattern (where N=4) on a single symbol, meaning that the PRS resource is scheduled in every Nth (fourth) tone of the symbol. Uniform tone spacing on a single symbol, as in comb pattern 1120, allows low complexity FFT-based channel estimation, but creates time domain aliasing. The rightmost comb pattern 1130 is a comb-N pattern with staggering across multiple symbols (four in comb pattern 1130). Staggering avoids aliasing by aggregating CE across staggered symbols, but introduces sensitivity to Doppler. The comb pattern repeats in the frequency domain for all PRBs of the PRS resource.

Figure 12:
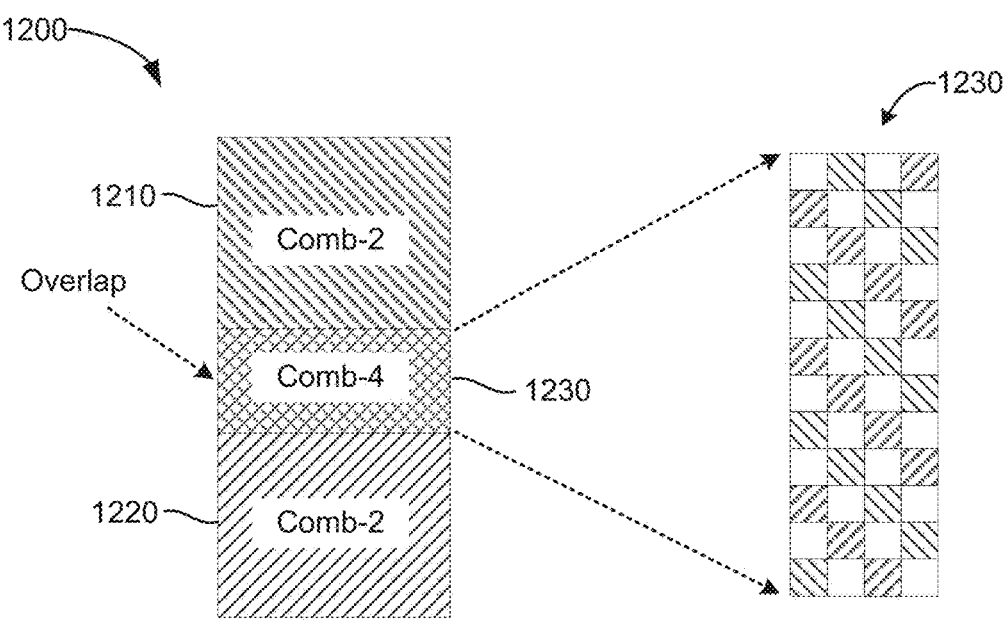
FIG. 12 is a diagram illustrating an example of changing the comb pattern within the overlap region, according to aspects of the disclosure.

FIG. 12 is a diagram 1200 illustrating an example of changing the comb pattern within the overlap region, according to aspects of the disclosure. In FIG. 12, time is represented horizontally and frequency is represented vertically. FIG. 12 illustrates two PRS resources, a first PRS resource 1210 and a second PRS resource 1220. In the example of FIG. 12, the length of each PRS resource 1210 and 1220 in the time domain may be four symbols and the bandwidth may be 100 MHz. The PRS resources 1210 and 1220 may be DL PRS or UL PRS (e.g., SRS). A first transmitter (e.g., a UE or base station) may transmit PRS on the PRS resources 1210 and a second transmitter may transmit PRS on the PRS resources 1220. However, the same receiver (e.g., a base station or UE) may measure PRS on the different PRS resources 1210 and 1220.

In the example of FIG. 12, the first PRS resource 1210 and the second PRS resource 1220 both have a comb-2 comb pattern. However, in the overlap region 1230, they have a comb-4 comb pattern. This allows them to overlap in the overlap region 1230 without their respective REs colliding or otherwise interfering with each other, as shown in the detail of the overlap region 1230 on the right side of FIG. 12. In the detail of the overlap region 1230, each block of the overlap region 1230 represents an RE, and as such, is one symbol in the time domain and one tone, or subcarrier, in the frequency domain. Shaded, or cross-hatched, blocks represent REs of the PRS resource having the same type of shading/cross-hatching. As can be seen, in the overlap region 1230, the REs of PRS resource 1210 have offsets of 3, 0, 1, 2 (from left to right and top to bottom) and the REs of PRS resource 1220 have offsets of 1, 2, 3, 4 (from left to right and top to bottom).

By using a different comb pattern in the overlap region 1230, the PRS resources 1210 and 1220 can interleave without their respective REs colliding or otherwise interfering with each other. In addition, in this particular example, using the comb-2 and comb-4 comb patterns maintains the comb-2 scheduling throughout the bandwidth of the PRS resources 1210 and 1220 (although this is not necessary). Maintaining the same comb size may be beneficial, however, where the same receiver is measuring both PRS resources 1210 and 1220 and has indicated a capability for measuring comb-2 PRS. In that way, the receiver is not expected to measure PRS in REs that are contiguous in the time domain, as would be the case for interleaving two comb-2 PRS resources.

Note that while FIG. 12 illustrates particular comb sizes and resource lengths, these are merely examples and the disclosure is not so limited. For example, if the PRS resources 1210 and 1220 were two symbols in length, the first two or last two symbols of the overlap region would not be present, but the comb patterns would otherwise be the same.

Referring now to using a different muting pattern in the overlap region, muting is where a transmitter refrains from transmitting a scheduled PRS (or other signal), typically to avoid interfering, at the receiver, with other signals from other transmitters. The muting pattern may be specified at the symbol, slot, subframe, frame, etc. level (i.e., all REs carrying the PRS within the symbol, slot, subframe, frame, etc. are muted/not transmitted), and typically applies to the entire bandwidth of the PRS (or other signal) being muted.

Figure 13:
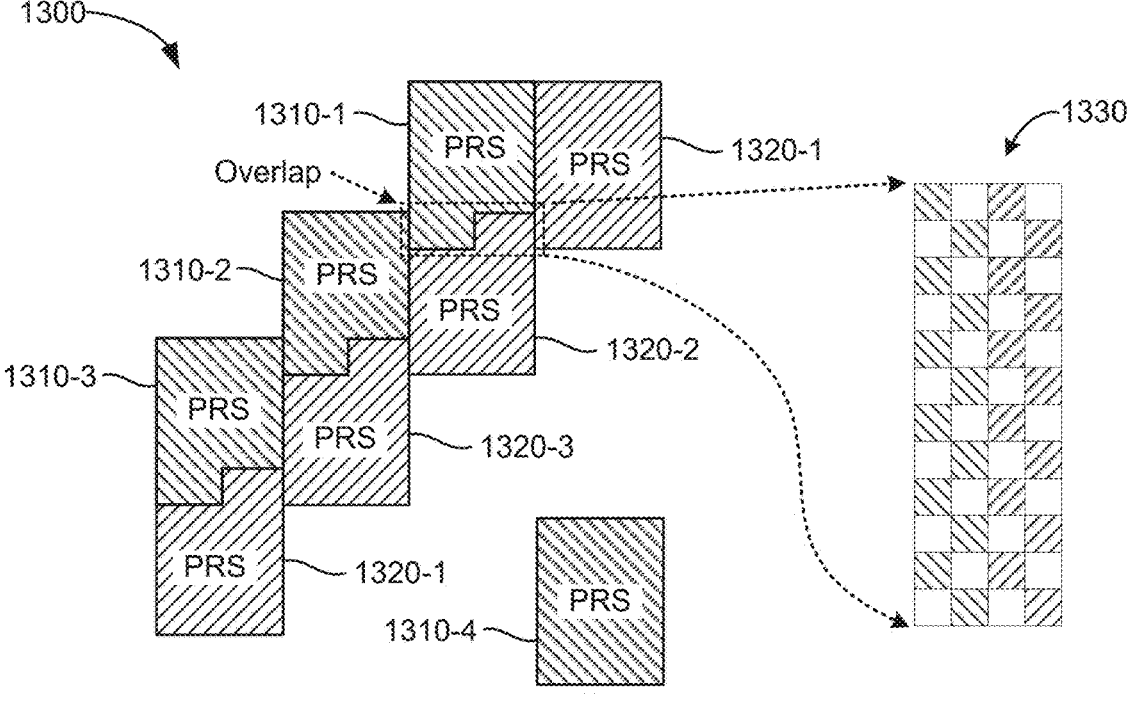
FIG. 13 is a diagram illustrating an example of changing the muting pattern within the overlap region, according to aspects of the disclosure.

FIG. 13 is a diagram 1300 illustrating an example of changing the muting pattern within the overlap region, according to aspects of the disclosure. In FIG. 13, time is represented horizontally and frequency is represented vertically. FIG. 13 illustrates two PRS resources, a first PRS resource 1310 and a second PRS resource 1320. In the example of FIG. 13, the length of each PRS resource 1310 and 1320 in the time domain may be four symbols and the bandwidth may be 100 MHz. The PRS resources 1310 and 1320 may be DL PRS or UL PRS (e.g., SRS). A first transmitter (e.g., a UE or base station) may transmit PRS on the PRS resources 1310 and a second transmitter may transmit PRS on the PRS resources 1320. However, the same receiver (e.g., a base station or UE) may measure PRS on the different PRS resources 1310 and 1320.

The present solution is compatible with comb sizes greater than or equal to comb-2 (a comb-1 comb size would not permit interleaving of the REs of PRS resources). As such, in the example of FIG. 13, the comb size of the PRS resources 1310 and 1320 is comb-2, as shown in the detail of the overlap region 1330. Specifically, in the detail of the overlap region 1330, each block represents an RE, and as such, is one symbol in the time domain and one tone, or subcarrier, in the frequency domain. Shaded, or cross-hatched, blocks represent REs of the PRS resource having the same type of shading/cross-hatching. As can be seen, in the overlap region 1330, the REs of PRS resource 1310 are present in the first two symbols of the overlap region 1330 but have been muted in the second two symbols. Similarly, the REs of PRS resource 1320 have been muted in the first two symbols of the overlap region 1330 but are present in the second two symbols.

Muting the first half of the PRS resource 1320 and the second half of the PRS resource 1310 in the overlap region 1330 eliminates interference at the receiver to the PRS resource 1310 and PRS resource 1320, respectively, that would otherwise be caused by the PRS resource 1320 and PRS resource 1310, respectively. This allows the receiver to use the phase estimate of a previous repetition of the PRS resource 1320, for example, in the overlap region 1330 to estimate the phase of the next repetition of the PRS resource 1320.

Note that while FIG. 13 illustrates muting half of a PRS resource, it need not be half the PRS resource that is muted. Instead, where the PRS resources are more than two symbols in length, only the last one or more symbols of the second PRS resource could be muted (e.g., the last one symbol of a four-symbol PRS resource, the last two symbols of a six-symbol PRS resource, etc.).

To implement the solutions illustrated in FIGS. 12 and 13, additional information would need to be added to the information currently provided for legacy PRS configurations. For example, the configuration of each PRS resource set would need to include information specifying the size of the overlap region (in REs, RBs, absolute bandwidth, or bandwidth ratio) and the comb size of the overlap region (as in the solution described with reference to FIG. 12) or the muting pattern of the overlap region (as in the solution described with reference to FIG. 13). In addition, for the solution described with reference to FIG. 12, the PRS configuration for a PRS resource set would need to include information describing how to interleave with other PRS resource sets. This information could be provided in one or more parameters or information elements (IEs), specified in the applicable standard, or the like.

Note that while FIGS. 6 to 10, 12, and 13 have illustrated contiguous time intervals, this is not necessary. Instead, there may be some small gap (e.g., a few symbols) between time intervals if the phases between consecutive PRS resources can still be estimated.

Figure 14:
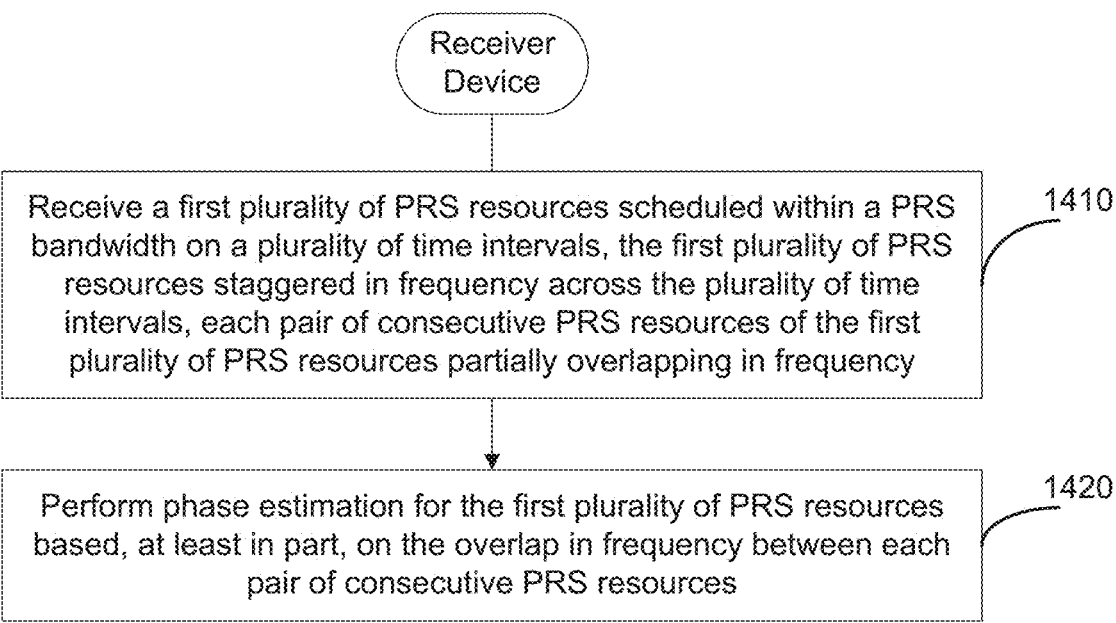

FIG. 14 illustrates an example method 1400 for wireless communication, according to aspects of the disclosure. In an aspect, the method 1400 may be performed by a receiver device (e.g., any of the base stations or UEs described herein).

At 1410, the receiver device receives a first plurality of repetitions of a first PRS resource (e.g., PRS resource 710, PRS resource 810/820, PRS resource 910/920/930, PRS resource 1010/1020/1030, PRS resource 1210/1220, PRS resource 1310/1320) scheduled within a PRS bandwidth (e.g., 400 MHz) on a plurality of contiguous time intervals (e.g., symbols, slots, subframes, etc.), the first plurality of repetitions staggered in frequency across the plurality of contiguous time intervals (as illustrated in FIGS. 6-10, 12, and 13), each pair of consecutive repetitions of the first plurality of repetitions partially overlapping in frequency (as illustrated in FIGS. 7-10, 12, and 13). In an aspect, where the receiver device is a UE, operation 1410 may be performed by WWAN transceiver 310, short-range wireless transceiver 320, processing system 332, memory component 340, and/or positioning component 342, any or all of which may be considered means for performing this operation. In an aspect, where the receiver device is a base station, operation 1410 may be performed by WWAN transceiver 350, short-range wireless transceiver 360, processing system 384, memory component 386, and/or positioning component 388, any or all of which may be considered means for performing this operation.

At 1420, the receiver device performs phase estimation for the first plurality of repetitions based, at least in part, on the overlap in frequency between each pair of consecutive repetitions. In an aspect, where the receiver device is a UE, operation 1420 may be performed by WWAN transceiver 310, short-range wireless transceiver 320, processing system 332, memory component 340, and/or positioning component 342, any or all of which may be considered means for performing this operation. In an aspect, where the receiver device is a base station, operation 1420 may be performed by WWAN transceiver 350, short-range wireless transceiver 360, processing system 384, memory component 386, and/or positioning component 388, any or all of which may be considered means for performing this operation.

FIG. 15 illustrates an example method 1500 for wireless communication, according to aspects of the disclosure. In an aspect, the method 1500 may be performed by a network entity (e.g., a location server, serving base station).

At 1510, the network entity schedules a first plurality of repetitions of a first PRS resource (e.g., PRS resource 710, PRS resource 810/820, PRS resource 910/920/930, PRS resource 1010/1020/1030, PRS resource 1210/1220, PRS resource 1310/1320) within a PRS bandwidth (e.g., 400 MHz) on a plurality of contiguous time intervals (e.g., symbols, slots, subframes, etc.), the first plurality of repetitions staggered in frequency across the plurality of contiguous time intervals (as illustrated in FIGS. 6-10, 12, and 13), wherein each pair of consecutive repetitions of the first plurality of repetitions is configured to partially overlap in frequency (as illustrated in FIGS. 7-10, 12, and 13). In an aspect, where the network entity is a base station, operation 1510 may be performed by WWAN transceiver 350, short-range wireless transceiver 360, processing system 384, memory component 386, and/or positioning component 388, any or all of which may be considered means for performing this operation. In an aspect, where the network entity is a location server, operation 1510 may be performed by network interface(s) 390, processing system 394, memory component 396, and/or positioning component 398, any or all of which may be considered means for performing this operation.

At 1520, the network entity transmits an indication of at least the overlap in frequency between each pair of consecutive repetitions of the first plurality of repetitions to enable a receiver device (e.g., any of the base stations or UEs described herein) to perform phase estimation based, at least in part, on the overlap in frequency between each pair of consecutive repetitions. In an aspect, where the network entity is a base station, operation 1520 may be performed by WWAN transceiver 350, short-range wireless transceiver 360, processing system 384, memory component 386, and/or positioning component 388, any or all of which may be considered means for performing this operation. In an aspect, where the network entity is a location server, operation 1520 may be performed by network interface(s) 390, processing system 394, memory component 396, and/or positioning component 398, any or all of which may be considered means for performing this operation.

As will be appreciated, a technical advantage of the methods 1400 and 1500 is improved phase estimation across multiple PRS resources, resulting in a larger synthetic PRS bandwidth, which results in improved measurement accuracy, and therefore improved positioning accuracy.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a receiver device, comprising: receiving a first plurality of positioning reference signal (PRS) resources scheduled within a PRS bandwidth on a plurality of time intervals, the first plurality of PRS resources staggered in frequency across the plurality of time intervals, each pair of consecutive PRS resources of the first plurality of PRS resources partially overlapping in frequency; and performing phase estimation for the first plurality of PRS resources based, at least in part, on the overlap in frequency between each pair of consecutive PRS resources.

Clause 2. The method of clause 1, further comprising: receiving a configuration of a size of the overlap in frequency.

Clause 3. The method of clause 2, wherein the configuration of the size of the overlap in frequency is received from a location server or a serving base station.

Clause 4. The method of any of clauses 1 to 3, further comprising: transmitting a recommendation of a size of the overlap in frequency to a network entity.

Clause 5. The method of clause 4, wherein the network entity comprises a location server or a serving base station.

Clause 6. The method of any of clauses 1 to 5, wherein a size of the overlap in frequency is specified as a number of bandwidth intervals, an amount of bandwidth, or a ratio of a bandwidth of each of the first plurality of PRS resources to the PRS bandwidth.

Clause 7. The method of clause 6, wherein the number of bandwidth intervals comprises a number of resource elements, a number of resource blocks, or both.

Clause 8. The method of any of clauses 1 to 7, wherein: at least a second plurality of PRS resources are scheduled within the PRS bandwidth on the plurality of time intervals, the second plurality of PRS resources staggered in frequency across the plurality of time intervals, and at least one PRS resource of the first plurality of PRS resources, at least one PRS resource of the second plurality of PRS resources, or both, wrap around in the PRS bandwidth in at least one time interval of the plurality of time intervals.

Clause 9. The method of clause 8, wherein a number of the plurality of time intervals is based on the PRS bandwidth divided by a bandwidth of each of the first plurality of PRS resources.

Clause 10. The method of clause 8, wherein a number of the plurality of time intervals is given by a mathematical floor function of the PRS bandwidth divided by a bandwidth of each of the first plurality of PRS resources.

Clause 11. The method of clause 8, wherein a number of the plurality of time intervals is at least one time interval more than a mathematical floor function of the PRS bandwidth divided by a bandwidth of each of the first plurality of PRS resources.

Clause 12. The method of clause 8, wherein a number of the plurality of time intervals is less than or equal to the PRS bandwidth divided by a bandwidth of each of the first plurality of PRS resources.

Clause 13. The method of clause 8, wherein a number of the plurality of time intervals is greater than or equal to the PRS bandwidth divided by a bandwidth of each of the first plurality of PRS resources.

Clause 14. The method of any of clauses 8 to 13, wherein a number of the first plurality of PRS resources is the same as a number of the second plurality of PRS resources.

Clause 15. The method of any of clauses 8 to 14, further comprising: receiving the second plurality of PRS resources, each pair of consecutive PRS resources of the second plurality of PRS resources partially overlapping in frequency; and performing phase estimation for the second plurality of PRS resources based, at least in part, on the overlap in frequency between each pair of consecutive PRS resources of the second plurality of PRS resources.

Clause 16. The method of any of clauses 8 to 15, wherein one or more PRS resources of the second plurality of PRS resources overlaps in frequency with one or more PRS resources of the first plurality of PRS resources in one or more time intervals of the plurality of time intervals.

Clause 17. The method of clause 16, wherein: the first plurality of PRS resources has a first comb pattern, the second plurality of PRS resources has a second comb pattern, and the one or more PRS resources of the first plurality of PRS resources and the one or more PRS resources of the second plurality of PRS resources have a third comb pattern in an overlap region between each of the one or more PRS resources of the first plurality of PRS resources and the one or more PRS resources of the second plurality of PRS resources.

Clause 18. The method of clause 17, wherein: the first comb pattern is the same as the second comb pattern, and the third comb pattern is twice the first comb pattern.

Clause 19. The method of any of clauses 17 to 18, wherein symbols of the one or more PRS resources of the first plurality of PRS resources in the overlap region are interleaved with symbols of the one or more PRS resources of the second plurality of PRS resources.

Clause 20. The method of any of clauses 17 to 19, further comprising: receiving a configuration of at least the third comb pattern.

Clause 21. The method of clause 16, wherein a first muting pattern of an overlap region between each of the one or more PRS resources of the first plurality of PRS resources and the one or more PRS resources of the second plurality of PRS resources is different than a second muting pattern of a non-overlap region of the one or more PRS resources of the second plurality of PRS resources.

Clause 22. The method of clause 21, wherein the first muting pattern comprises muting one or more symbols adjacent to a start of a subsequent time interval.

Clause 23. The method of any of clauses 21 to 22, further comprising: receiving a configuration of at least the first muting pattern.

Clause 24. The method of any of clauses 1 to 23, further comprising: performing one or more positioning measurements of the first PRS resource based, at least in part, on the phase estimation.

Clause 25. The method of any of clauses 1 to 24, wherein the receiver device is a UE.

Clause 26. The method of any of clauses 1 to 24, wherein the receiver device is a base station.

Clause 27. The method of any of clauses 1 to 26, wherein a number of the first plurality of PRS resources is the same as a number of the plurality of time intervals.

Clause 28. The method of any of clauses 1 to 27, wherein the plurality of time intervals is a plurality of contiguous time intervals.

Clause 29. The method of any of clauses 1 to 27, wherein time intervals of the plurality of time intervals are separated by a gap less than a threshold.

Clause 30. The method of any of clauses 1 to 29, wherein the plurality of PRS resources is a plurality of repetitions of a PRS resource.

Clause 31. A method of wireless communication performed by a network entity, comprising: scheduling a first plurality of positioning reference signal (PRS) resources within a PRS bandwidth on a plurality of time intervals, the first plurality of PRS resources staggered in frequency across the plurality of time intervals, wherein each pair of consecutive PRS resources of the first plurality of PRS resources is configured to partially overlap in frequency; and transmitting an indication of at least the overlap in frequency between each pair of consecutive PRS resources of the first plurality of PRS resources to enable a receiver device to perform phase estimation based, at least in part, on the overlap in frequency between each pair of consecutive PRS resources.

Clause 32. The method of clause 31, further comprising: receiving a recommendation of a size of the overlap in frequency, wherein the indication of at least the overlap in frequency is based on the recommendation.

Clause 33. The method of clause 32, wherein the recommendation is received from the receiver device or a serving base station.

Clause 34. The method of any of clauses 31 to 33, further comprising: transmitting a request for a size of the overlap in frequency.

Clause 35. The method of clause 34, wherein the request is transmitted to the receiver device or a serving base station.

Clause 36. The method of any of clauses 31 to 35, wherein a size of the overlap in frequency is specified as a number of bandwidth intervals, an amount of bandwidth, or a ratio of a bandwidth of each of the first plurality of PRS resources to the PRS bandwidth.

Clause 37. The method of clause 36, wherein the number of bandwidth intervals comprises a number of resource elements, a number of resource blocks, or both.

Clause 38. The method of any of clauses 31 to 37, further comprising: scheduling at least a second plurality of PRS resources within the PRS bandwidth on the plurality of time intervals, wherein the second plurality of PRS resources is staggered in frequency across the plurality of time intervals, and at least one PRS resource of the first plurality of PRS resources, and wherein at least one PRS resource of the second plurality of PRS resources, or both, wrap around in the PRS bandwidth in at least one time interval of the plurality of time intervals.

Clause 39. The method of clause 38, wherein a number of the plurality of time intervals is based on the PRS bandwidth divided by a bandwidth of each of the first plurality of PRS resources.

Clause 40. The method of clause 38, wherein a number of the plurality of time intervals is given by a mathematical floor function of the PRS bandwidth divided by a bandwidth of each of the first plurality of PRS resources.

Clause 41. The method of clause 38, wherein a number of the plurality of time intervals is at least one time interval more than a mathematical floor function of the PRS bandwidth divided by a bandwidth of each of the first plurality of PRS resources.

Clause 42. The method of clause 38, wherein a number of the plurality of time intervals is less than or equal to the PRS bandwidth divided by a bandwidth of each of the first plurality of PRS resources.

Clause 43. The method of clause 38, wherein a number of the plurality of time intervals is greater than or equal to the PRS bandwidth divided by a bandwidth of each of the first plurality of PRS resources.

Clause 44. The method of any of clauses 38 to 43, wherein a number of the first plurality of PRS resources is the same as a number of the second plurality of PRS resources.

Clause 45. The method of any of clauses 38 to 44, wherein one or more PRS resources of the second plurality of PRS resources overlap in frequency with one or more PRS resources of the first plurality of PRS resources in one or more time intervals of the plurality of time intervals.

Clause 46. The method of clause 45, wherein: the first plurality of PRS resources has a first comb pattern, the second plurality of PRS resources has a second comb pattern, and the one or more PRS resources of the first plurality of PRS resources and the one or more PRS resources of the second plurality of PRS resources have a third comb pattern in an overlap region between each of the one or more PRS resources of the first plurality of PRS resources and the one or more PRS resources of the second plurality of PRS resources.

Clause 47. The method of clause 46, wherein: the first comb pattern is the same as the second comb pattern, and the third comb pattern is twice the first comb pattern.

Clause 48. The method of any of clauses 46 to 47, wherein symbols of the one or more PRS resources of the first plurality of PRS resources in the overlap region are interleaved with symbols of the one or more PRS resources of the second plurality of PRS resources.

Clause 49. The method of any of clauses 46 to 48, further comprising: transmitting a configuration of at least the third comb pattern to the receiver device.

Clause 50. The method of clause 45, wherein a first muting pattern of an overlap region between each of the one or more PRS resources of the first plurality of PRS resources and the one or more PRS resources of the second plurality of PRS resources is different than a second muting pattern of a non-overlap region of the one or more PRS resources of the second plurality of PRS resources.

Clause 51. The method of clause 50, wherein the first muting pattern comprises muting one or more symbols adjacent to a start of a subsequent time interval.

Clause 52. The method of any of clauses 50 to 51, further comprising: transmitting a configuration of at least the first muting pattern to the receiver device.

Clause 53. The method of any of clauses 31 to 52, wherein the receiver device is a UE.

Clause 54. The method of any of clauses 31 to 52, wherein the receiver device is a base station.

Clause 55. The method of any of clauses 31 to 54, wherein the network entity is a location server or a serving base station.

Clause 56. The method of any of clauses 31 to 55, wherein a number of the first plurality of PRS resources is the same as a number of the plurality of time intervals.

Clause 57. The method of any of clauses 31 to 56, wherein the plurality of time intervals is a plurality of contiguous time intervals.

Clause 58. The method of any of clauses 31 to 56, wherein time intervals of the plurality of time intervals are separated by a gap less than a threshold.

Clause 59. The method of any of clauses 31 to 58, wherein the plurality of PRS resources is a plurality of repetitions of a PRS resource.

Clause 60. An apparatus comprising memory, at least one transceiver, and at least one processor communicatively coupled to the memory and the at least one transceiver, the at least one processor configured to perform a method in accordance with any of clauses 1 to 59.

Clause 61. An apparatus comprising means for performing a method in accordance with any of clauses 1 to 59.

Clause 62. A computer-readable medium storing computer-executable instructions, the computer-executable instructions comprising at least one instruction for causing an apparatus to perform a method in accordance with any of clauses 1 to 59.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a receiver device, comprising:

receiving a first plurality of repetitions of a first positioning reference signal (PRS) resource scheduled within a PRS bandwidth on a plurality of time intervals, the first plurality of repetitions of the first PRS resource staggered in frequency across the plurality of time intervals, each pair of consecutive repetitions of the first plurality of repetitions of the first PRS resources partially overlapping in frequency; and performing phase estimation for the first plurality of repetitions of the first PRS resource based, at least in part, on the overlap in frequency between each pair of consecutive repetitions.

2. The method of claim 1, further comprising:

receiving a configuration of a size of the overlap in frequency.

3. The method of claim 2, wherein the configuration of the size of the overlap in frequency is received from a location server or a serving base station.

4. The method of claim 1, further comprising:

transmitting a recommendation of a size of the overlap in frequency to a network entity.

5. The method of claim 4, wherein the network entity comprises a location server or a serving base station.

6. The method of claim 1, wherein a size of the overlap in frequency is specified as a number of bandwidth intervals, an amount of bandwidth, or a ratio of a bandwidth of each of the first plurality of repetitions of the first PRS resource to the PRS bandwidth.

7. The method of claim 6, wherein the number of bandwidth intervals comprises a number of resource elements, a number of resource blocks, or both.

8. The method of claim 1, wherein:

at least a second plurality of repetitions of a second PRS resource are scheduled within the PRS bandwidth on the plurality of time intervals, the second plurality of repetitions of the second PRS resource staggered in frequency across the plurality of time intervals, and at least one repetition of the first plurality of repetitions of the first PRS resource, at least one repetition of the second plurality of repetitions of the second PRS resource, or both, wrap around in the PRS bandwidth in at least one time interval of the plurality of time intervals.

9. The method of claim 8, wherein a number of the plurality of time intervals is based on the PRS bandwidth divided by a bandwidth of each of the first plurality of repetitions of the first PRS resource.

10. The method of claim 8, wherein a number of the plurality of time intervals is given by a mathematical floor function of the PRS bandwidth divided by a bandwidth of each of the first plurality of repetitions of the first PRS resource.

11. The method of claim 8, wherein a number of the plurality of time intervals is at least one time interval more than a mathematical floor function of the PRS bandwidth divided by a bandwidth of each of the first plurality of repetitions of the first PRS resource.

12. The method of claim 8, wherein a number of the plurality of time intervals is less than or equal to the PRS bandwidth divided by a bandwidth of each of the first plurality of repetitions of the first PRS resource.

13. The method of claim 8, wherein a number of the plurality of time intervals is greater than or equal to the PRS bandwidth divided by a bandwidth of each of the first plurality of repetitions of the first PRS resource.

14. The method of claim 8, wherein a number of the first plurality of repetitions of the first PRS resource is the same as a number of the second plurality of repetitions of the second PRS resource.

15. The method of claim 8, further comprising:

receiving the second plurality of repetitions of the second PRS resource, each pair of consecutive repetitions of the second plurality of repetitions of the second PRS resource partially overlapping in frequency; and performing phase estimation for the second plurality of repetitions of the second PRS resource based, at least in part, on the overlap in frequency between each pair of consecutive repetitions of the second plurality of repetitions of the second PRS resource.

16. The method of claim 8, wherein one or more repetitions of the second plurality of repetitions of the second PRS resource overlaps in frequency with one or more repetitions of the first plurality of repetitions of the first PRS resource in one or more time intervals of the plurality of time intervals.

17. The method of claim 16, wherein:

the first plurality of repetitions of the first PRS resource has a first comb pattern, the second plurality of repetitions of the second PRS resource has a second comb pattern, and the one or more repetitions of the first plurality of repetitions of the first PRS resource and the one or more repetitions of the second plurality of repetitions of the first PRS resource have a third comb pattern in an overlap region between each of the one or more repetitions of the first plurality of repetitions of the first PRS resource and the one or more repetitions of the second plurality of repetitions of the second PRS resource.

18. The method of claim 17, wherein:

the first comb pattern is the same as the second comb pattern, and the third comb pattern is twice the first comb pattern.

19. The method of claim 17, wherein symbols of the one or more repetitions of the first plurality of repetitions of the first PRS resource in the overlap region are interleaved with symbols of the one or more repetitions of the second plurality of repetitions of the second PRS resource.

20. The method of claim 17, further comprising:

receiving a configuration of at least the third comb pattern.

21. The method of claim 16, wherein a first muting pattern of an overlap region between each of the one or more repetitions of the first plurality of repetitions of the first PRS resource and the one or more repetitions of the second plurality of repetitions of the second PRS resource is different than a second muting pattern of a non-overlap region of the one or more repetitions of the second plurality of repetitions of the second PRS resource.

22. The method of claim 21, wherein the first muting pattern comprises muting one or more symbols adjacent to a start of a subsequent time interval.

23. The method of claim 21, further comprising:

receiving a configuration of at least the first muting pattern.

24. The method of claim 1, further comprising:

performing one or more positioning measurements of the first plurality of repetitions of the first PRS resource based, at least in part, on the phase estimation.

25. The method of claim 1, wherein the receiver device is a UE.

26. The method of claim 1, wherein the receiver device is a base station.

27. The method of claim 1, wherein a number of the first plurality of repetitions of the first PRS resource is the same as a number of the plurality of time intervals.

28. The method of claim 1, wherein the plurality of time intervals is a plurality of contiguous time intervals.

29. The method of claim 1, wherein time intervals of the plurality of time intervals are separated by a gap less than a threshold.

30. A method of wireless communication performed by a network entity, comprising:

scheduling a first plurality of repetitions of a first positioning reference signal (PRS) resource within a PRS bandwidth on a plurality of time intervals, the first plurality of repetitions of the first PRS resource staggered in frequency across the plurality of time intervals, wherein each pair of consecutive of the first plurality of repetitions of the first PRS resource is configured to partially overlap in frequency; and transmitting an indication of at least the overlap in frequency between each pair of consecutive repetitions of the first plurality of repetitions of the first PRS resource to enable a receiver device to perform phase estimation based, at least in part, on the overlap in frequency between each pair of consecutive repetitions.

31. The method of claim 30, further comprising:

receiving a recommendation of a size of the overlap in frequency, wherein the indication of at least the overlap in frequency is based on the recommendation.

32. The method of claim 31, wherein the recommendation is received from the receiver device or a serving base station.

33. The method of claim 30, further comprising:

transmitting a request for a size of the overlap in frequency.

34. The method of claim 33, wherein the request is transmitted to the receiver device or a serving base station.

35. The method of claim 30, wherein a size of the overlap in frequency is specified as a number of bandwidth intervals, an amount of bandwidth, or a ratio of a bandwidth of each of the first plurality of repetitions of the first PRS resource to the PRS bandwidth.

36. The method of claim 35, wherein the number of bandwidth intervals comprises a number of resource elements, a number of resource blocks, or both.

37. The method of claim 30, further comprising:

scheduling at least a second plurality of repetitions of the second PRS resource within the PRS bandwidth on the plurality of time intervals, wherein the second plurality of repetitions of the second PRS resource is staggered in frequency across the plurality of time intervals, and wherein at least one repetition of the first plurality of repetitions of the first PRS resource, at least one repetition of the second plurality of repetitions of the second PRS resource, or both, wrap around in the PRS bandwidth in at least one time interval of the plurality of time intervals.

38. The method of claim 37, wherein a number of the plurality of time intervals is based on the PRS bandwidth divided by a bandwidth of each of the first plurality of repetitions of the first PRS resource.

39. The method of claim 37, wherein a number of the plurality of time intervals is given by a mathematical floor function of the PRS bandwidth divided by a bandwidth of each of the first plurality of repetitions of the first PRS resource.

40. The method of claim 37, wherein a number of the plurality of time intervals is at least one time interval more than a mathematical floor function of the PRS bandwidth divided by a bandwidth of each of the first plurality of repetitions of the first PRS resource.

41. The method of claim 37, wherein a number of the plurality of time intervals is less than or equal to the PRS bandwidth divided by a bandwidth of each of the first plurality of repetitions of the first PRS resource.

42. The method of claim 37, wherein a number of the plurality of time intervals is greater than or equal to the PRS bandwidth divided by a bandwidth of each of the first plurality of repetitions of the first PRS resource.

43. The method of claim 37, wherein a number of the first plurality of repetitions of the first PRS resource is the same as a number of the second plurality of repetitions of the second PRS resource.

44. The method of claim 37, wherein one or more repetitions of the second plurality of repetitions of the second PRS resource overlap in frequency with one or more repetitions of the first plurality of repetitions of the first PRS resource in one or more time intervals of the plurality of time intervals.

45. The method of claim 44, wherein:

the first plurality of repetitions of the first PRS resource has a first comb pattern, the second plurality of repetitions of the second PRS resource has a second comb pattern, and the one or more repetitions of the first plurality of repetitions of the first PRS resource and the one or more repetitions of the second plurality of repetitions of the second PRS resource have a third comb pattern in an overlap region between each of the one or more repetitions of the first plurality of repetitions of the first PRS resource and the one or more repetitions of the second plurality of repetitions of the second PRS resource.

46. The method of claim 45, wherein:

the first comb pattern is the same as the second comb pattern, and the third comb pattern is twice the first comb pattern.

47. The method of claim 45, wherein symbols of the one or more repetitions of the first plurality of repetitions of the first PRS resource in the overlap region are interleaved with symbols of the one or more repetitions of the second plurality of repetitions of the second PRS resource.

48. The method of claim 45, further comprising:

transmitting a configuration of at least the third comb pattern to the receiver device.

49. The method of claim 44, wherein a first muting pattern of an overlap region between each of the one or more repetitions of the first plurality of repetitions of the first PRS resource and the one or more repetitions of the second plurality of repetitions of the second PRS resource is different than a second muting pattern of a non-overlap region of the one or more repetitions of the second plurality of repetitions of the second PRS resource.

50. The method of claim 49, wherein the first muting pattern comprises muting one or more symbols adjacent to a start of a subsequent time interval.

51. The method of claim 49, further comprising:

transmitting a configuration of at least the first muting pattern to the receiver device.

52. The method of claim 30, wherein the receiver device is a UE or a base station.

53. The method of claim 30, wherein the network entity is a location server or a serving base station.

54. The method of claim 30, wherein a number of the first plurality of repetitions of the first PRS resource is the same as a number of the plurality of time intervals.

55. The method of claim 30, wherein the plurality of time intervals is a plurality of contiguous time intervals.

56. The method of claim 30, wherein time intervals of the plurality of time intervals are separated by a gap less than a threshold.

46

57. A receiver device, comprising:

a memory;

at least one transceiver; and at least one processor communicatively coupled to the memory and the at least one transceiver, the at least one processor configured to:

receive a first plurality of repetitions of a first positioning reference signal (PRS) resource scheduled within a PRS bandwidth on a plurality of time intervals, the first plurality of repetitions of the first PRS resource staggered in frequency across the plurality of time intervals, each pair of consecutive repetitions of the first plurality of repetitions of the first PRS resource partially overlapping in frequency; and perform phase estimation for the first plurality of repetitions of the first PRS resource based, at least in part, on the overlap in frequency between each pair of consecutive repetitions.

58. A network entity, comprising:

a memory;

at least one transceiver; and at least one processor communicatively coupled to the memory and the at least one transceiver, the at least one processor configured to:

schedule a first plurality of repetitions of a first positioning reference signal (PRS) resource within a PRS bandwidth on a plurality of time intervals, the first plurality of repetitions of the first PRS resource staggered in frequency across the plurality of time intervals, wherein each pair of consecutive repetitions of the first plurality of repetitions of the first PRS resource is configured to partially overlap in frequency; and cause the at least one transceiver to transmit an indication of at least the overlap in frequency between each pair of consecutive of the first plurality of repetitions of the first PRS resource to enable a receiver device to perform phase estimation based, at least in part, on the overlap in frequency between each pair of consecutive repetitions.

* * * * *